(12) United States Patent
Ide et al.

(10) Patent No.: US 8,254,732 B2
(45) Date of Patent: Aug. 28, 2012

(54) PHASE MODULATOR AND OPTICAL MODULATION DEVICE

(75) Inventors: Masafumi Ide, Tokorozawa (JP); Takaaki Takeishi, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 405 days.

(21) Appl. No.: 12/721,205

(22) Filed: Mar. 10, 2010

(65) Prior Publication Data

US 2010/0231817 A1    Sep. 16, 2010

(30) Foreign Application Priority Data

Mar. 11, 2009 (JP) .................. 2009-057946
Dec. 14, 2009 (JP) .................. 2009-283134

(51) Int. Cl.
*G02F 1/35* (2006.01)
(52) U.S. Cl. .................................................. 385/3
(58) Field of Classification Search .................. 385/3
See application file for complete search history.

(56) References Cited

U.S. PATENT DOCUMENTS

2006/0267640 A1 * 11/2006 Travis .................. 327/105

FOREIGN PATENT DOCUMENTS

| JP | 62-094823 | A  | 5/1987  |
|----|-----------|----|---------|
| JP | 06-072964 | B2 | 8/1987  |
| JP | 3210061   | B2 | 10/1993 |
| JP | 3189198   | B2 | 2/1997  |
| JP | 3681918   | B2 | 7/2000  |
| JP | 2008-122856 | A | 5/2008 |
| JP | 2008-216640 | A | 9/2008 |
| JP | 2008-241968 | A | 10/2008 |
| JP | 2008-271028 | A | 11/2008 |

* cited by examiner

*Primary Examiner* — Timothy L Rude
(74) *Attorney, Agent, or Firm* — Sughrue Mion, PLLC

(57) ABSTRACT

An optical modulator 100 includes an input unit 110, a splitter unit 120, a first waveguide 131, a second waveguide 132, a directional coupler unit 140, a first output unit 151, a second output unit 152, a first liquid-crystal cell 161, and a second liquid-crystal cell 162. The splitter unit 120, the first waveguide 131, the second waveguide 132, and the directional coupler unit 140 form an optical interferometer that branches an input light and causes the branched lights to interfere. The first liquid-crystal cell 161 and the second liquid-crystal cell 162 transmit the lights branched in the optical interferometer and delay the lights according to applied signals, respectively. The second liquid-crystal cell 162 is thinner than the first liquid-crystal cell 161.

20 Claims, 13 Drawing Sheets

PHASE MODULATOR AND OPTICAL MODULATION DEVICE

BACKGROUND OF THE INVENTION

1. Field of the Invention

The present invention relates to a phase modulator and an optical modulation device for modulating light.

2. Description of the Related Art

Mach-Zehnder interferometers (MZI) have been conventionally used, for example, to decode a phase-modulated optical signal. In optical interferometers such as MZI, dither signals have been used to control the phase modulation amount and to stabilize the operation point (see, for example, Patent Document 1 and Patent Document 2 cited below).

As a small-phase-modulation element that uses dither signal, a phase modulator of which phase modulation amount can be adjusted by applying heat by a heater, and a phase modulator that uses the electro-optical effect of a non-linear optical crystal such as $LiNbO_3$ have been used. Furthermore, a technology has been disclosed in which a liquid-crystal optical modulation element is inserted as a phase modulator in either one of the arms of the MZI (see, for example, Patent Document 3 cited below).

[Patent Document 1] Japanese Patent Application Laid-Open Publication No. 2008-271028

[Patent Document 2] Japanese Patent No. 3210061

[Patent Document 3] Japanese Patent Application Laid-Open Publication No. 2008-122856

However, the phase modulator that uses the heating by the heater described above requires current drive, and thus has a problem of large power consumption ($P=I^2R$, where I is current and R is resistance) during normal operation. On the other hand, the phase modulator that uses the non-linear optical crystal requires a high drive voltage of 10 volts or more, and thus requires a high-voltage-resistant drive circuit and has a problem of large power consumption ($P \propto fV^2$, where f is frequency and V is voltage).

Regarding the phase modulator that uses the liquid-crystal optical modulation element described above, the liquid-crystal cell needs to be thick to control the phase modulation amount for one wavelength ($2\pi$) or more. On the other hand, the thicker the liquid-crystal cell is, the slower the response speed thereof becomes, and thus the liquid-crystal cell becomes incapable of responding to the small-phase-modulation signal of several kHz for small modulation signal (dither signal). As a result, such a phase modulator cannot stabilize the operation point, and thus cannot perform stable phase modulation.

To solve the above problems, the present invention aims to provide a phase modulator and an optical modulation device with reduced power consumption. The present invention also aims to provide a phase modulator and an optical modulation device capable of stabilized phase modulation.

SUMMARY OF THE INVENTION

To solve the above problems and achieve the aims, an optical modulator according to the present invention includes: a first liquid-crystal cell that includes a first liquid-crystal layer between a pair of substrates; a second liquid-crystal cell that includes a second liquid-crystal layer between a pair of substrates; and a drive circuit that drives each of the first liquid-crystal cell and the second liquid-crystal cell, wherein the second liquid-crystal layer is thinner than the first liquid-crystal layer, and the drive circuit includes a phase-modulation unit that delays a light passing through the first liquid-crystal cell and applies a phase-modulation signal to control the phase of the light; and a small-modulation unit that delays a light passing through the second liquid-crystal cell and applies a small-phase-modulation signal to finely control the phase of the light.

According to the present invention, phase modulation of a sufficient phase amount is performed by applying the phase-modulation signal to the first thick liquid-crystal cell, while small phase modulation is performed by applying the small-phase-modulation signal to the second thin liquid-crystal cell having high response speed.

EFFECT OF INVENTION

The phase modulator and the optical modulation device according to the present invention effect configuration of a control system configured with a simple and low-voltage-resistant drive circuit and further effect suppression of increases in power consumption. The phase modulator and the optical modulation device according to the present invention also effect stabilized phase modulation.

DETAILED DESCRIPTION OF THE PREFERRED EMBODIMENTS

Referring to the accompanying drawings, exemplary embodiments of a phase modulator and an optical modulation device according to the present invention are explained in detail below.

(Embodiment)
(Configuration of Optical Modulator)

Figure 1:
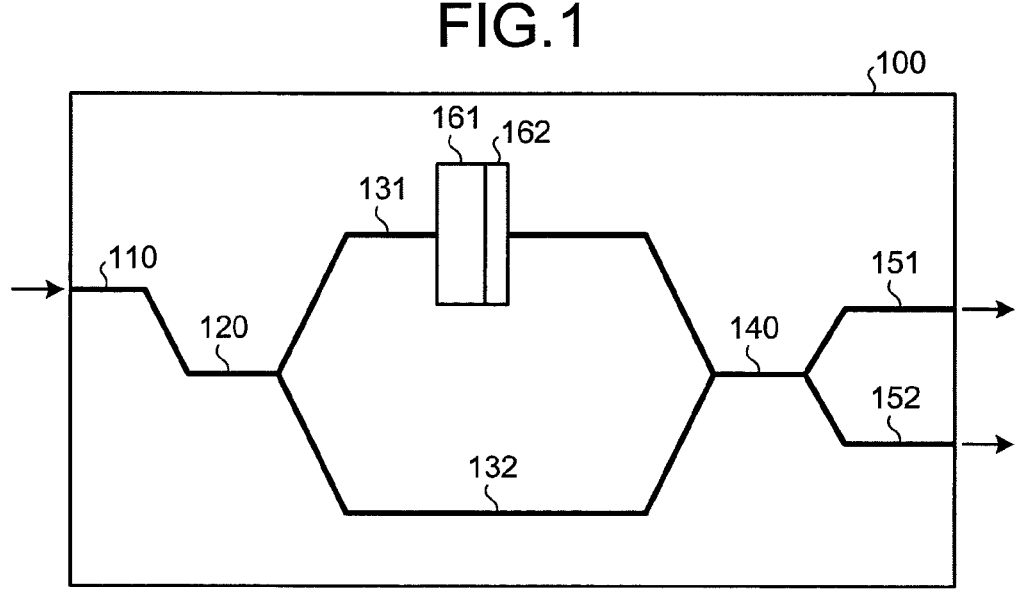
FIG. 1 is a plan view depicting a configuration of an optical modulator according to an embodiment.

FIG. 1 is a plan view depicting a configuration of an optical modulator according to an embodiment. As depicted in FIG. 1, an optical modulator 100 according to the embodiment is an MZI modulator that includes an input unit 110, a splitter unit 120, a first waveguide 131, a second waveguide 132, a directional coupler unit 140, a first output unit 151, a second output unit 152, a first liquid-crystal cell 161, and a second liquid-crystal cell 162. An input light to the optical modulator 100 is input to the input unit 110. The input unit 110 outputs the input light to the splitter unit 120.

The splitter unit 120, the first waveguide 131, the second waveguide 132, and the directional coupler unit 140 form an optical interferometer that branches the input light and causes the branched lights to interfere. The splitter unit 120 branches the light from the input unit 110, and outputs the branched lights to the first waveguide 131 and the second waveguide 132, respectively. The splitter unit 120 is, for example, a 3 dB coupler.

The first waveguide 131 and the second waveguide 132 form the arms of a Mach-Zehnder (MZI) optical interferometer. The first waveguide 131 transmits, and outputs the light from the splitter unit 120 to the directional coupler unit 140. The second waveguide 132 transmits, and outputs the light from the splitter unit 120 to the directional coupler unit 140.

The directional coupler unit 140 causes the light from the first waveguide 131 and the light from the second waveguide 132 to interfere. The directional coupler unit 140 outputs the combined light to the first output unit 151 and the second output unit 152, respectively. The first output unit 151 and the second output unit 152 respectively output the light from the directional coupler unit 140 downstream.

The first liquid-crystal cell 161 (first liquid-crystal cell) and the second liquid-crystal cell 162 (second liquid-crystal) respectively transmit the one of the lights branched in the optical interferometer, and delay the transmitted light according to applied signals. Here, the first liquid-crystal cell 161 and the second liquid-crystal cell 162 are layered and integrated into one (see FIG. 8 for the details), and arranged on the optical path of the first waveguide 131. In the figure, the first liquid-crystal cell 161 is provided on the input side and the second liquid-crystal cell 162 is provided on the output side; however, the order may be interchanged.

The phase modulation amount of the first liquid-crystal cell 161 and the second liquid-crystal cell 162 is (no+Δn(V))×d, where birefringence Δn is a function of voltage and expressed by Δn=neff−no; ne is the extraordinary refractive index in a direction parallel to the long axis of the liquid-crystal molecules; neff is the effective refractive index of the liquid-crystal cell controlled by an applied voltage and varies between ne and no; no is the ordinary refractive index in the direction perpendicular to the long axis of the liquid-crystal molecules; and d is the cell thickness of the liquid-crystal cell. The cell thickness d is set to be different for the first liquid-crystal cell 161 and the second liquid-crystal cell 162.

The response time of the first liquid-crystal cell 161 and the second liquid-crystal cell 162 is proportional to the square of the cell thickness $d^2$. The cell thickness of the first liquid-crystal cell 161 is greater than that of the second liquid-crystal cell 162. As a result, the first liquid-crystal cell 161 has a longer response time to the applied signal. The cell thickness of the second liquid-crystal cell 162 is smaller than that of the first liquid-crystal cell 161. As a result, the second liquid-crystal cell 162 has a shorter response time to the applied signal.

When the input to the input unit 110 is regarded as 1 for normalization, the response characteristics of the output I of the second output unit 152 can be expressed by equation (1) described below. In equation (1), δφ represents the phase difference between the first waveguide 131 and the second waveguide 132. The phase difference δφ is expressed by: δφ=(phase difference of the optical path without the liquid-crystal layer)+(phase amount of the first liquid-crystal cell 161)+(phase amount of the second liquid-crystal cell 162).

(Equation 1)

$$I = \frac{1}{2}(1 + \sin(\delta\phi)) \quad (1)$$

The outputs of the first output unit 151 and the second output unit 152 have reverse (complementary) phases to each other. Thus, when the output of the second output unit 152 is maximum, the output of the first output unit 151 becomes minimum, and when the output of the second output unit 152 is minimum, the output of the first output unit 151 becomes maximum. When the phase difference δφ is 0, the levels of the outputs of the first output unit 151 and the second output unit 152 become equal.

(Configuration of Optical Modulation Device)

Figure 2:
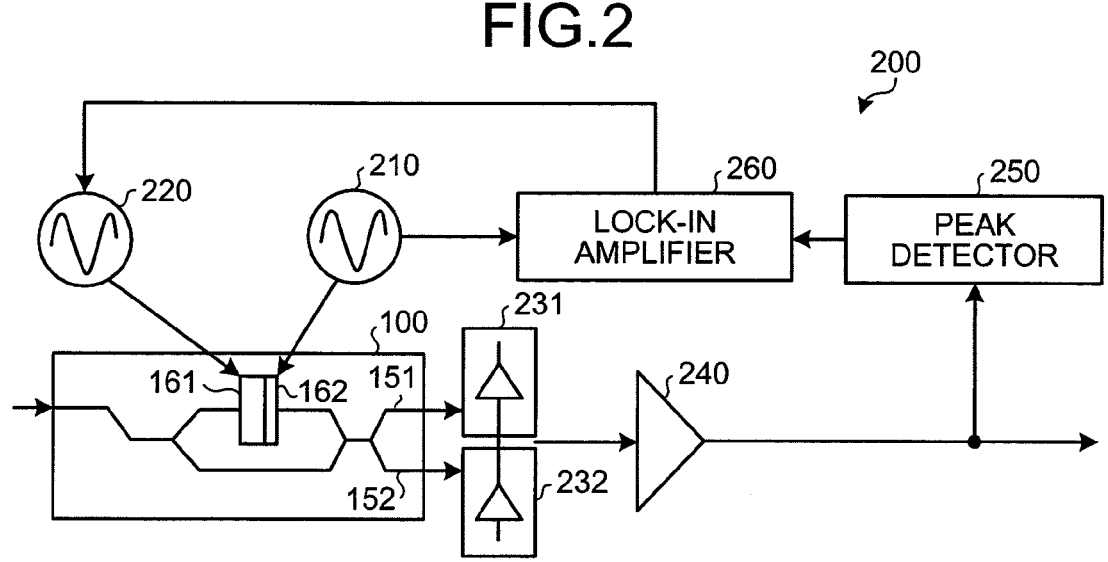
FIG. 2 is a schematic depicting a configuration of an optical modulation device that includes the optical modulator depicted in FIG. 1.

FIG. 2 is a schematic depicting a configuration of an optical modulation device that includes the optical modulator depicted in FIG. 1. As depicted in FIG. 2, an optical modulation device 200 includes the optical modulator 100, a reference-signal generator 210, a phase-modulation-signal generator 220, a first photo diode (PD) 231, a second PD 232, an amplifier 240, a peak detector 250, and a lock-in amplifier 260. The reference-signal generator 210, the phase-modulation-signal generator 220, the first PD 231, the second PD 232, the amplifier 240, the peak detector 250, and the lock-in amplifier 260 form a control system of the optical modulator 100.

The reference-signal generator 210 is a small-modulation unit that generates, for example, a reference signal h×sin(x) of about 100 Hz to 5 kHz and applies the generated reference signal h×sin(x) to the second liquid-crystal cell 162 as a dither signal. Here, h is a small (phase) amplitude. The dither signal applied to the second liquid-crystal cell 162 is a small-phase-modulation signal that finely controls the phase of the light passing through the second liquid-crystal cell 162. The reference-signal generator 210 outputs the reference signal h×sin(x) to the lock-in amplifier 260.

The phase-modulation-signal generator 220 is a phase modulation unit that generates a phase-modulation signal (for example, effectively 100 Hz or less; or a quasi-constant value in a stable state) according to the output voltage V of the lock-in amplifier 260 proportional to the difference signal between the outputs of the first PD 231 and the second PD 232, and applies the generated phase-modulation signal to the first liquid-crystal cell 161. The phase-modulation signal applied to the first liquid-crystal cell 161 is a signal to modulate the phase of the light passing through the first liquid-crystal cell 161, change the operation point of the optical modulator 100, and suppress the fluctuation of output behavior. It is assumed that the bit rate of the input light to the optical modulator 100 has a sufficiently higher frequency than the reference signal h×sin(x) and the phase-modulation signal (for example, several Gbps to several tens of Gbps).

The first PD 231 receives the light from the first output unit 151 of the optical modulator 100, and outputs an electrical signal indicating the power of the received light to the amplifier 240. The second PD 232 receives the light from the second output unit 152 of the optical modulator 100, and outputs an electrical signal indicating the power of the received light to the amplifier 240. The amplifier 240 amplifies the electrical signals output from the first PD 231 and the second PD 232, and outputs the amplified electrical signals to the peak detector 250. The amplifier 240 also outputs the amplified electrical signals to the subsequent optical signal receiver (not depicted).

The peak detector 250 detects the small-amplitude-modulation component (including sin(x) component) of the electrical signal output from the amplifier 240 (for example, the difference between the average signal output of the first output unit 151 and of the second output unit 152). The peak detector 250 outputs the detected amplitude-modulation component to the lock-in amplifier 260 as an error signal Ie. The peak detector 250 is configured so as to respond to the reference signal of the envelope of a low-frequency wave proportional to the small-amplitude-modulation component in the optical signal. The error signal Ie output from the peak detector 250 can be expressed by equation (2) described below, using the dither signal h×sin(x) (where h is a small phase) applied to the second liquid-crystal cell 162.

(Equation 2)

$$Ie = \frac{1}{2}(1 + \sin(\delta\phi + h \cdot \sin(x))) \quad (2)$$

In equation (2) above, x=ωt=2πft, where f is the frequency of the reference signal h×sin(x) generated by the reference-signal generator 210, and t is time. The lock-in amplifier 260 outputs a signal proportional to the phase difference between the reference signal h×sin(x) output from the reference-signal generator 210 and the error signal Ie output from the peak detector 250. The output voltage V of the lock-in amplifier 260 is output to the phase-modulation-signal generator 220.

As described above, the optical modulation device 200 detects the variation component (the small-amplitude-modulation component) that is caused by the small-phase-modulation signal (dither signal) applied to the second liquid-crystal cell 162 and included in the light that has passed through the first liquid-crystal cell 161 and the second liquid-crystal cell 162, and based on the result of the detection (the error signal Ie), controls the phase-modulation signal applied to the first liquid-crystal cell 161.

(Relationship Between Phase Modulation Characteristics and Error Signal)

Figure 3:
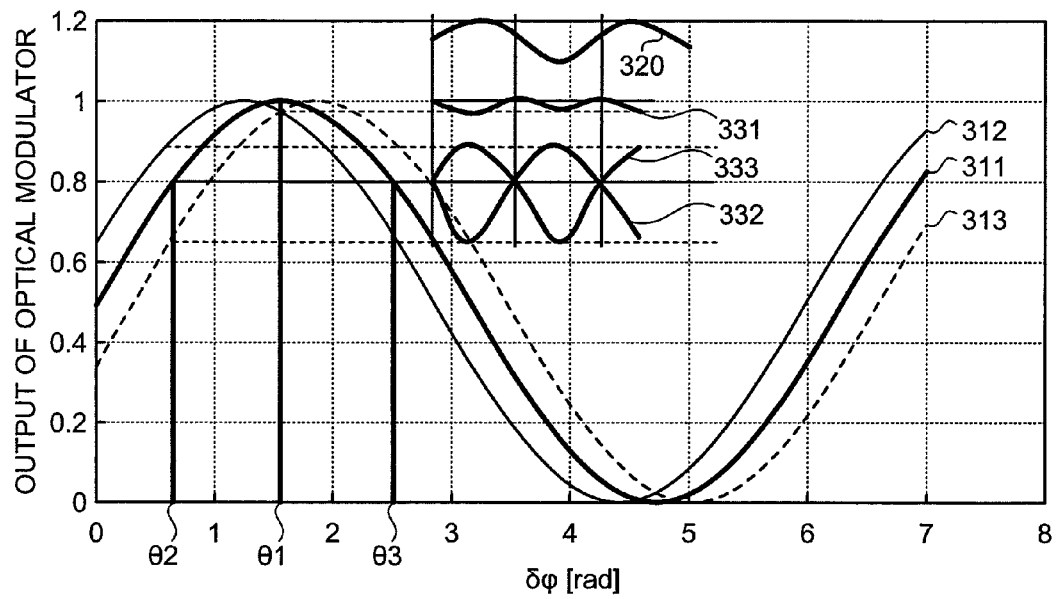
FIG. 3 is a graph depicting the relationship between the phase modulation characteristics of a liquid-crystal cell and an error signal.

FIG. 3 is a graph depicting the relationship between the phase modulation characteristics of the liquid-crystal cell and the error signal. In FIG. 3, the horizontal axis represents the phase difference δφ [rad] between the first waveguide 131 and the second waveguide 132. The figure depicts an example of the response characteristics of the optical modulator 100 in the phase modulation range of about 2π within which the first liquid-crystal cell 161 can control the phase modulation. The vertical axis represents the output of the optical modulator 100 (for example, the output of the second output unit 152). A response characteristic 311 is an example of the response characteristics of the output of the optical modulator 100 when the dither signal provides a phase amount that is just half of the modulation range.

The phase amount θ1 is the optimal phase amount of the first liquid-crystal cell 161 (the delay amount is optimal) that makes the output of the optical modulator 100 close to the maximum value 1 that is the operation point to which the output is to be adjusted. The phase amount θ2 is a phase amount of the first liquid-crystal cell 161 smaller than the optimal phase amount θ1 (the delay amount is smaller). The phase amount θ3 is a phase amount of the first liquid-crystal cell 161 greater than the optimal phase amount θ1 (the delay amount is greater).

A reference signal 320 is the reference signal h×sin(x) described above. An error signal 331 is the error signal Ie when the phase amount of the first liquid-crystal cell 161 is the phase amount θ1. An error signal 332 is the error signal Ie when the phase amount of the first liquid-crystal cell 161 is the phase amount θ2. An error signal 333 is the error signal Ie when the phase amount of the first liquid-crystal cell 161 is the phase amount θ3.

The frequency of the error signal 331 is twice that of the reference signal 320. In this case, the output signal V of the lock-in amplifier 260 is 0. The error signal 332 has a reversed phase with respect to the reference signal 320. The error signal 333 has the same phase as the reference signal 320.

The output signal V of the lock-in amplifier 260 is supposed to be proportional to the integral of the error signal Ie multiplied by a normalized reference signal sin(x) over one cycle of x (from 0 to 2π). In other words, the output signal V of the lock-in amplifier 260 can be expressed by the following equation (3).

(Equation 3)

$$V = \int_0^{2\pi} Ie \cdot \sin(x) dx \quad (3)$$

A response characteristic 312 is the response characteristics of the output of the optical modulator 100 at the moment when the phase amount of the applied dither signal is decreased from the state of response characteristic 311. A response characteristic 313 is the response characteristics of the output of the optical modulator 100 at the moment when the phase amount of the dither signal is increased from the state of response characteristic 311. As indicated by the response characteristics 312 and 313, by changing the phase amount of the dither signal, it can be determined whether the phase amount that the first liquid-crystal cell can change is deviated to be smaller than the optimal operation point θ1 of the optical modulator 100 as represented by θ2, or deviated to be greater as represented by θ3. Thus, optimization of the operation point can be achieved by feeding back the output of the error signal Ie to the phase amount of the first liquid-crystal cell.

(Output Signal of Lock-in Amplifier)

Figure 4:
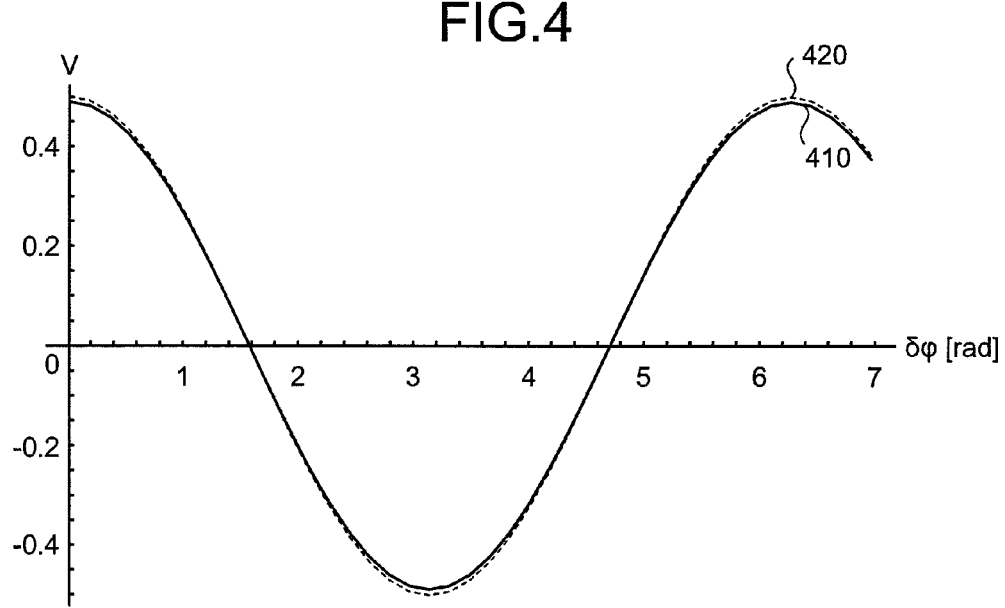
FIG. 4 is an example of a graph of an output signal of a lock-in amplifier.

FIG. 4 is an example of a graph of the output signal of the lock-in amplifier. In FIG. 4, the horizontal axis represents the phase difference δφ [rad] between the first waveguide 131 and the second waveguide 132. It is assumed that, for example, the range of the phase amount adjustable in the phase modulation by the first liquid-crystal cell 161 is $2\pi$, and the small phase amplitude h of the dither signal is $\pi/10$. In this case, the output signal V of the lock-in amplifier 260 expressed by equation (3) above is represented by an output waveform 410 depicted in FIG. 4.

A waveform 420 represents $\frac{1}{2}\times\cos\delta\phi$ that is the differential of the output I of equation (1) above with respect to the phase difference $\delta\phi$. Since the output waveform 410 and the waveform 420 almost overlap each other, the output signal V of the lock-in amplifier 260 is supposed to coincide with the differential waveform of the phase modulation characteristics of the first liquid-crystal cell 161 when the small phase amplitude h of the dither signal applied to the second liquid-crystal cell 162 is sufficiently small.

Thus, the phase-modulation-signal generator 220 can make the phase amount of the first liquid-crystal cell 161 closer to the optimal phase amount (the phase amount $\theta1$ depicted in FIG. 3) by controlling the phase-modulation signal applied to the first liquid-crystal cell 161 such that the output signal V from the lock-in amplifier 260 approaches 0.

Here, an example is described in which the output of the second output unit 152 of the optical modulator 100 (or the difference between direct current of the first output unit 151 and the second output unit 152) is monitored, and the phase-modulation signal is controlled such that the monitored output becomes maximum. Alternatively, since the outputs of the first output unit 151 and the second output unit 152 have reversed phases, the phase-modulation signal may be controlled such that the level of the light output from the first output unit 151 becomes minimum, thereby maximizing the level of the light output from the second output unit 152.

(Waveform of Modulation Signal)

Generally speaking, the liquid-crystal cell applied with DC component deteriorates due to the localization of residual ion components and/or the decomposition of the liquid crystal material, etc. Thus, the phase-modulation signal applied to the first liquid-crystal cell 161 is preferably alternating electric field. Regarding the phase-modulation signal applied to the first liquid-crystal cell 161, it is also preferable to take into account the dielectric dispersion characteristics due to impurity ions to prevent the generation of space charge layer formed in the liquid-crystal layer by the residual impurity ions. For example, the phase-modulation signal applied to the first liquid-crystal cell 161 has a frequency on the order of kHz (about 10 kHz to 20 kHz).

Figure 5:
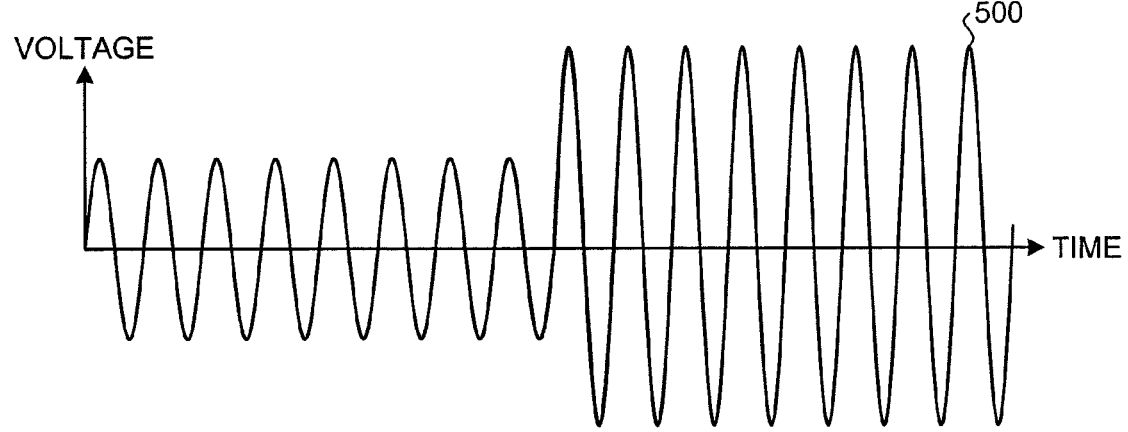
FIG. 5 is a graph of an example of a waveform of a modulation signal.

FIG. 5 is a graph of an example of a waveform of the modulation signal. In FIG. 5, the horizontal axis represents time, while the vertical axis represents voltage. A signal 500 depicted in FIG. 5, for example, is preferably used as the phase-modulation signal applied to the first liquid-crystal cell 161. The signal 500 is an amplitude-modulated drive signal in which a signal having a carrier frequency that is sufficiently high to prevent the waveform response of the first liquid-crystal cell 161 is multiplied with a control signal for controlling the behavior of the liquid-crystal layer in the first liquid-crystal cell 161. Here, a sine wave is used as the carrier waveform; however, a square wave or a triangle wave may be used as the carrier waveform.

The dither signal applied to the second liquid-crystal cell 162 may be a simple sine wave when the frequency of the reference signal $h\times\sin(x)$ is several kHz or more. However, when the frequency of the reference signal $h\times\sin(x)$ is 1 kHz or less, similar to the phase-modulation signal applied to the first liquid-crystal cell 161, the dither signal is preferably an amplitude-modulated drive signal in which a signal having a sufficiently high carrier frequency is multiplied with a control signal.

(Behavior of Liquid-Crystal Cell)

Figure 6:
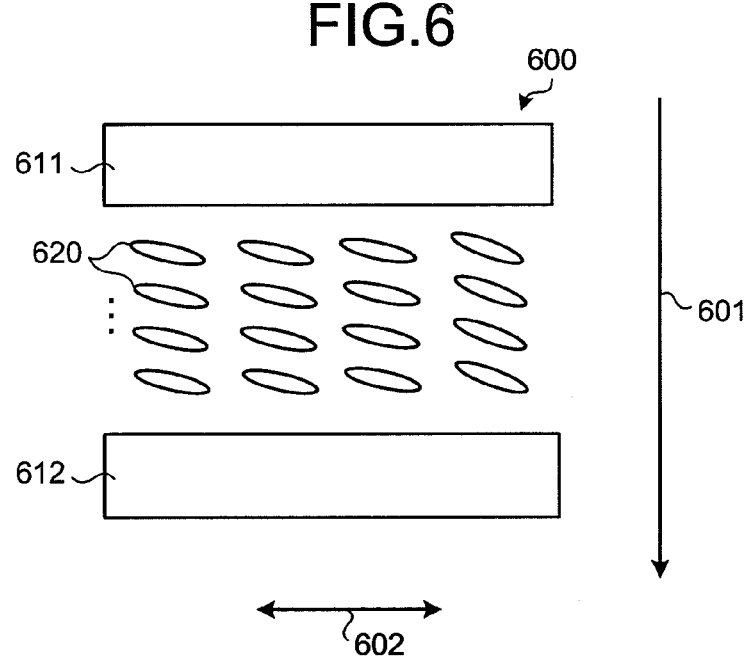
FIG. 6 is a schematic depicting a behavior of the liquid-crystal cell (tilted planar alignment cell)

FIG. 6 is a schematic depicting behavior of the liquid-crystal cell (tilted planar alignment cell). A tilted planar-alignment nematic liquid crystal (NLC) 600 depicted in FIG. 6 can be used, for example, as the first liquid-crystal cell 161 and the second liquid-crystal cell 162 (see FIG. 1). In FIG. 6, a traveling direction 601 indicates the traveling direction of light, and a polarization direction 602 indicates the polarization direction of the light.

The nematic liquid crystal 600 is configured with a first substrate 611, a second substrate 612, and liquid-crystal molecules 620. The liquid-crystal molecules 620 are sandwiched between the first substrate 611 and the second substrate 612. The first substrate 611 and the second substrate 612 are respectively, for example, a glass substrate. The nematic liquid crystal 600 is arranged such that the polarization direction 602 of the incident light is parallel to the director orientation (the average alignment of the liquid-crystal molecules 620). The electrode to which the modulation signal is applied is arranged, for example, on the entire surface of the first substrate 611 on the side of the liquid-crystal molecules 620 and the entire surface of the second substrate 612 on the side of the liquid-crystal molecules 620.

In the nematic liquid crystal 600, when the voltage of the modulated drive signal caused by the phase-modulation signal (or the dither signal) is low, the liquid-crystal molecules 620 become almost perpendicular to the traveling direction 601 of the light as depicted in FIG. 6. On the other hand, when the voltage of the modulated drive signal caused by the phase-modulation signal (or the dither signal) is high, the liquid-crystal molecules 620 become almost parallel to the traveling direction 601 of the light. Thus, the relationship between the voltage of the drive signal and the phase modulation amount changes such that the higher the voltage is, the smaller the phase amount becomes.

Figure 7:
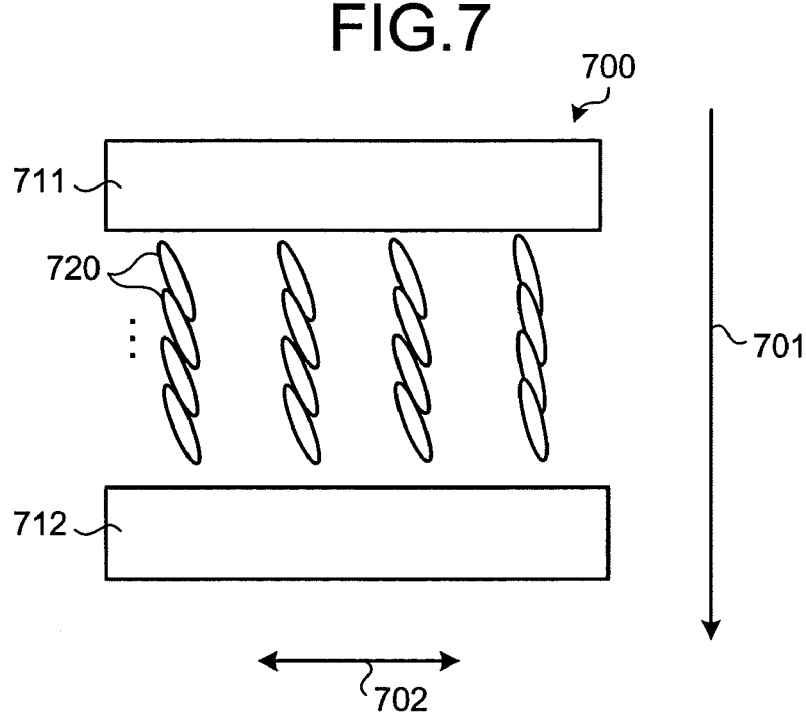
FIG. 7 is a schematic depicting a behavior of the liquid-crystal cell (vertical alignment cell)

FIG. 7 is a schematic depicting a behavior of the liquid-crystal cell (vertical alignment cell). A vertical-alignment nematic liquid crystal (NLC) 700 depicted in FIG. 7 can be used, for example, as the first liquid-crystal cell 161 and the second liquid-crystal cell 162 (see FIG. 1). In FIG. 7, a traveling direction 701 indicates the traveling direction of light, and a polarization direction 702 indicates the polarization direction of the light.

The nematic liquid crystal 700 is configured with a first substrate 711, a second substrate 712, and liquid-crystal molecules 720. The liquid-crystal molecules 720 are sandwiched between the first substrate 711 and the second substrate 712. The first substrate 711 and the second substrate 712 are respectively, for example, a glass substrate. The nematic liquid crystal 700 is arranged such that the polarization direction 702 of the incident light is parallel to the director orientation (the average alignment of the liquid-crystal molecules 720).

In the nematic liquid crystal 700, when the voltage of the modulated drive signal caused by the phase-modulation signal (or the dither signal) is low, the liquid-crystal molecules 720 become almost parallel to the traveling direction 701 of the light as depicted in FIG. 7. On the other hand, when the voltage of the modulated drive signal is high, in the nematic liquid crystal 700 the liquid-crystal molecules 720 become almost perpendicular to the traveling direction 701 of the light. Thus, in contrast to the tilted planar alignment cell, the relationship between the voltage of the drive signal and the phase modulation amount changes such that the higher the voltage is, the greater the phase amount becomes.

(Example of Configuration of Liquid-Crystal Cell)

Figure 8:
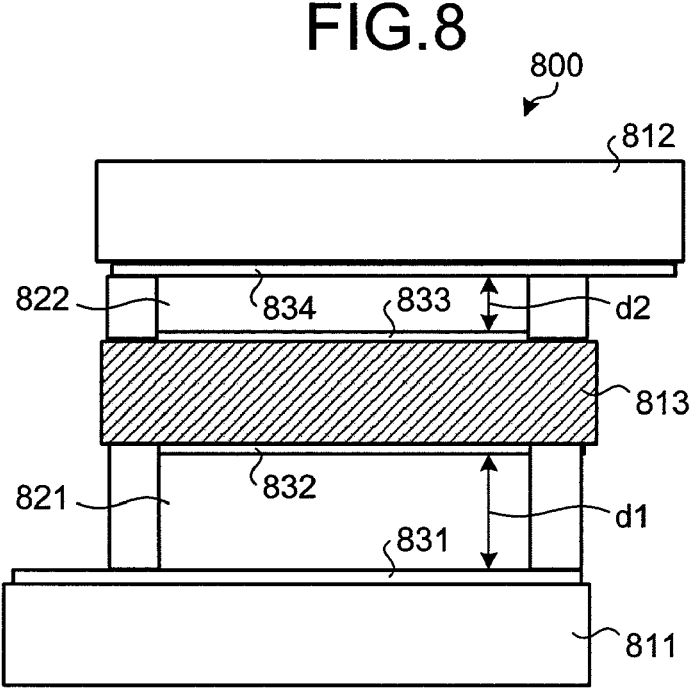
FIG. 8 is a frontal cross section of an example of a configuration of the liquid-crystal cell.
Figure 9:
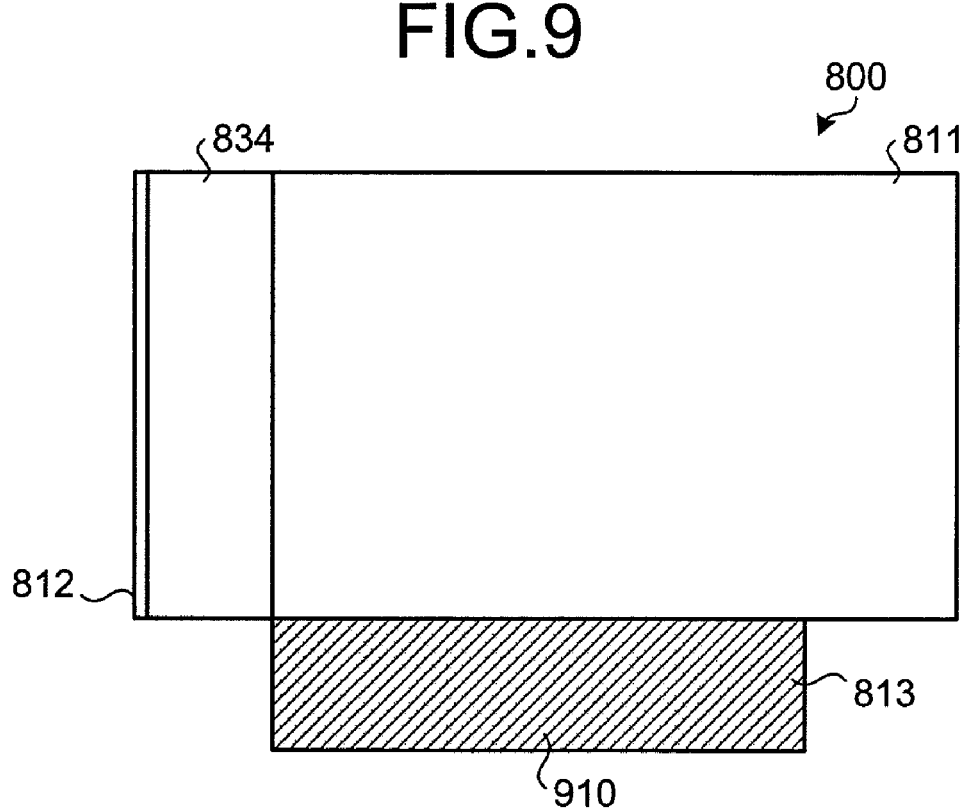
FIG. 9 is a plan view of the liquid-crystal cell depicted in FIG. 8.

FIG. 8 is a frontal cross section of an example of a configuration of the liquid-crystal cell. FIG. 9 is a plan view of the liquid-crystal cell depicted in FIG. 8. The first liquid-crystal cell 161 and the second liquid-crystal cell 162 are layered and integrated into one. The first liquid-crystal cell 161 and the second liquid-crystal cell 162 may be realized by, for example, a two-layer liquid-crystal cell module 800 depicted in FIGS. 8 and 9.

The two-layer liquid-crystal cell module 800 includes a first substrate 811, a second substrate 812, an intermediate substrate 813, a first liquid-crystal layer 821, and a second liquid-crystal layer 822. The first liquid-crystal layer 821 is sandwiched by the first substrate 811 and the intermediate substrate 813, and forms the first liquid-crystal cell 161. The second liquid-crystal layer 822 is sandwiched by the intermediate substrate 813 and the second substrate 812, and forms the second liquid-crystal cell 162. Cell thickness d1 is the cell thickness of the first liquid-crystal layer 821. Cell thickness d2 is the cell thickness of the second liquid-crystal layer 822.

An alignment film 831 and an alignment film 832 are arranged between the first liquid-crystal layer 821 and the first substrate 811 and between the first liquid-crystal layer 821 and the intermediate substrate 813, respectively. An alignment film 833 and an alignment film 834 are arranged between the second liquid-crystal layer 822 and the intermediate substrate 813 and between the second liquid-crystal layer 822 and the second substrate 812, respectively.

An electrode-connecting surface 910 depicted in FIG. 9 is an electrode-connecting surface of the intermediate substrate 813 for applying the modulation signal. Here, an example is described in which the first liquid-crystal cell 161 and the second liquid-crystal cell 162 are transmissive liquid-crystal devices; however, the first liquid-crystal cell 161 and the second liquid-crystal cell 162 may be reflective liquid-crystal devices in which a liquid crystal is sandwiched between a silicon substrate and a transparent substrate facing thereto (see, for example, FIGS. 16 to 23). In this figure, the first liquid-crystal cell 161 is provided on the upper side and the second liquid-crystal cell 162 is provided on the lower side; however, the order may be interchanged.

(Cell Thickness of Liquid-Crystal Cell)

The response time t of the first liquid-crystal cell 161 to the phase-modulation signal is proportional to the square of the cell thickness d1 of the first liquid-crystal cell 161 ($t \propto d1^2$). Since the liquid crystal material exhibits normal dispersion for optical communication wavelengths of 1.5 to 1.6 μm band (C band and L band), $\Delta n(=ne-no)$ is usually about 0.1. Thus, the cell thickness d1 needs to satisfy equation (4) described below to perform phase modulation of $2\pi$ for the wavelength of 1.6 μm.

(Equation 4)

$$\Delta n \times d1 > 1.6 \ [\mu m] \quad (4)$$

According to equation (4) above, the cell thickness d1 is preferably 16 μm or more when the liquid crystal material has a refractive index $\Delta n$ of 0.1. More preferably, the cell thickness d1 of the first liquid-crystal cell 161 is about 20 μm taking into account the poor movability of the liquid-crystal molecules near the boundary surface of the liquid-crystal cell and the low-voltage drive (5V or less).

On the other hand, the response time t of the second liquid-crystal cell 162 to the dither signal is proportional to the square of the cell thickness d2 of the second liquid-crystal cell 162 ($t \propto d2^2$). Regarding the second liquid-crystal cell 162, the response time needs to be fast enough to follow the dither signal of several kHz. Thus, the cell thickness d2 of the second liquid-crystal cell 162 is preferably ¼ (more preferably, 1/10) or less of the cell thickness d1 of the first liquid-crystal cell 161. For example, when the cell thickness d1 of the first liquid-crystal cell 161 is about 16 μm, the cell thickness d2 of the second liquid-crystal cell 162 is preferably 1 μm.

(Variation of Optical Modulator)

Figure 10:
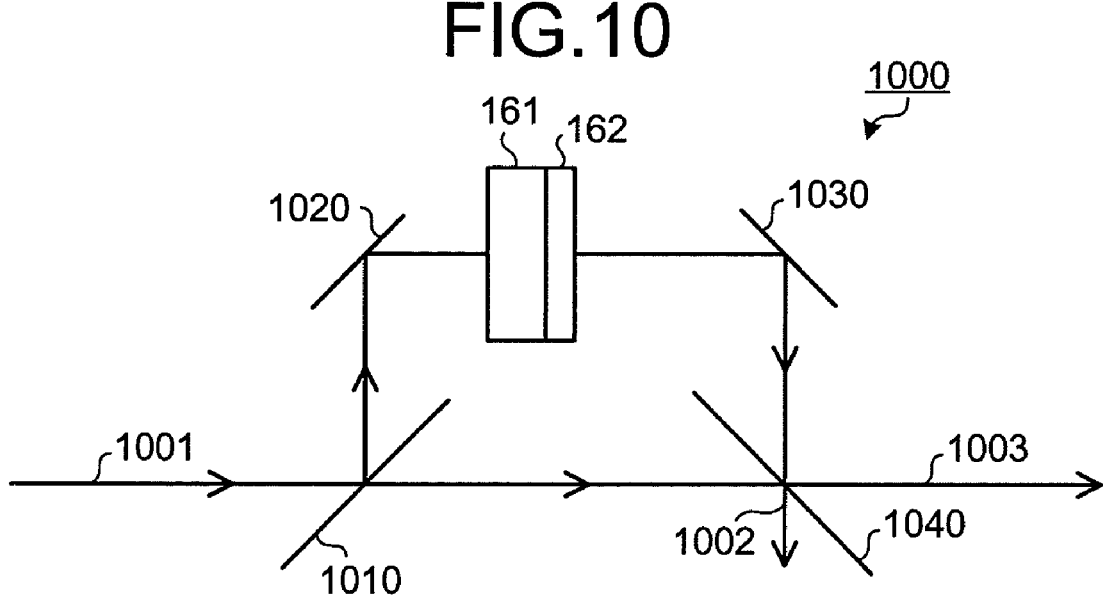
FIG. 10 is a plan view of a first variation of the optical modulator depicted in FIG. 1.

FIG. 10 is a plan view of a first variation of the optical modulator depicted in FIG. 1. In FIG. 10, elements that are similar to those of FIG. 1 are assigned the same corresponding signs, and explanation is omitted. As depicted in FIG. 10, an optical modulator 1000 includes a splitter 1010, a mirror 1020, a mirror 1030, a combiner 1040, the first liquid-crystal cell 161, and the second liquid-crystal cell 162. The splitter 1010, the mirror 1020, the mirror 1030, and the combiner 1040 form an optical interferometer that branches an input light 1001 and causes the branched lights to interfere. Not depicted in the figure, a phase delay element and/or a phase delay line may be inserted on the optical path between the splitter 1010 and the combiner 1040 to adjust the phase difference between the arms.

The input light 1001 to the optical modulator 1000 is input to the splitter 1010. The splitter 1010 branches the input light 1001 and outputs the branched lights to the mirror 1020 and the combiner 1040. The mirror 1020 reflects, and outputs the light from the splitter 1010 to the mirror 1030. The mirror 1030 reflects, and outputs the light from the mirror 1020 to the combiner 1040.

The combiner 1040 causes the light from the splitter 1010 and the light from the mirror 1030 to interfere. An output light 1002 and an output light 1003 obtained through the interference by the combiner 1040 are output downstream. For example, the output light 1002 corresponds to the output from the first output unit 151 depicted in FIG. 1. The output light 1003 corresponds to the output from the second output unit 152 depicted in FIG. 1.

The first liquid-crystal cell 161 and the second liquid-crystal cell 162 are arranged on the optical path of the light output from the mirror 1020 to the mirror 1030. The first liquid-crystal cell 161 transmits, and outputs the light from the mirror 1020 to the second liquid-crystal cell 162. The second liquid-crystal cell 162 transmits, and outputs the light from first liquid-crystal cell 161 to the mirror 1030. In the figure, the first liquid-crystal cell 161 is provided on the input side and the second liquid-crystal cell 162 is provided on the output side; however, the order may be interchanged.

Figure 11:
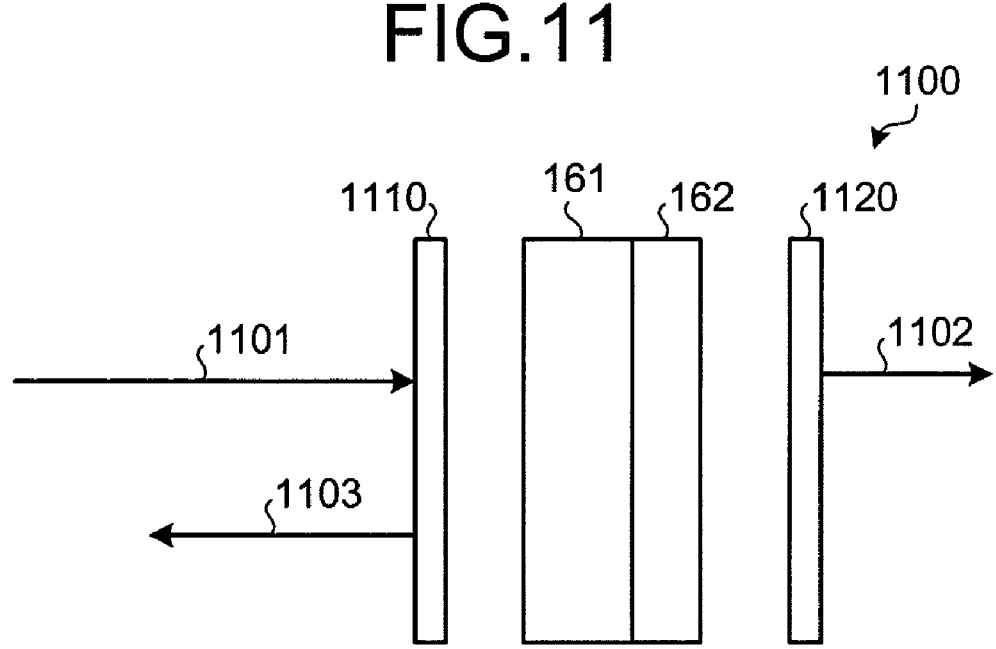
FIG. 11 is a plan view of a second variation of the optical modulator depicted in FIG. 1.

FIG. 11 is a plan view of a second variation of the optical modulator depicted in FIG. 1. In FIG. 11, elements that are similar to those of FIG. 1 are assigned the same corresponding signs, and explanation is omitted. An optical modulator 1100 depicted in FIG. 11 is a Fabry-Pérot interferometer that includes a splitter 1110, a combiner 1120, the first liquid-crystal cell 161, and the second liquid-crystal cell 162. In the figure, the first liquid-crystal cell 161 is provided on the left and the second liquid-crystal cell 162 is provided on the right; however, the order may be interchanged.

An input light 1101 to the optical modulator 1100 is input to the splitter 1110. The splitter 1110 outputs the input light 1101 to the side of the combiner 1120. The first liquid-crystal cell 161 and the second liquid-crystal cell 162 are arranged between the splitter 1110 and the combiner 1120. The light output from the splitter 1110 to the side of the combiner 1120 is multiple-reflected during transmission through the first liquid-crystal cell 161 and the second liquid-crystal cell 162.

A part of the light that has been multiple-reflected during transmission through the first liquid-crystal cell 161 and the second liquid-crystal cell 162 is output from the combiner 1120 as an output light 1102. The other part of the multiple-reflected light is output from the splitter 1110 as an output light 1103. For example, the output light 1102 corresponds to the output from the first output unit 151 depicted in FIG. 1. The output light 1103 corresponds to the output from the second output unit 152 depicted in FIG. 1.

Figure 12:
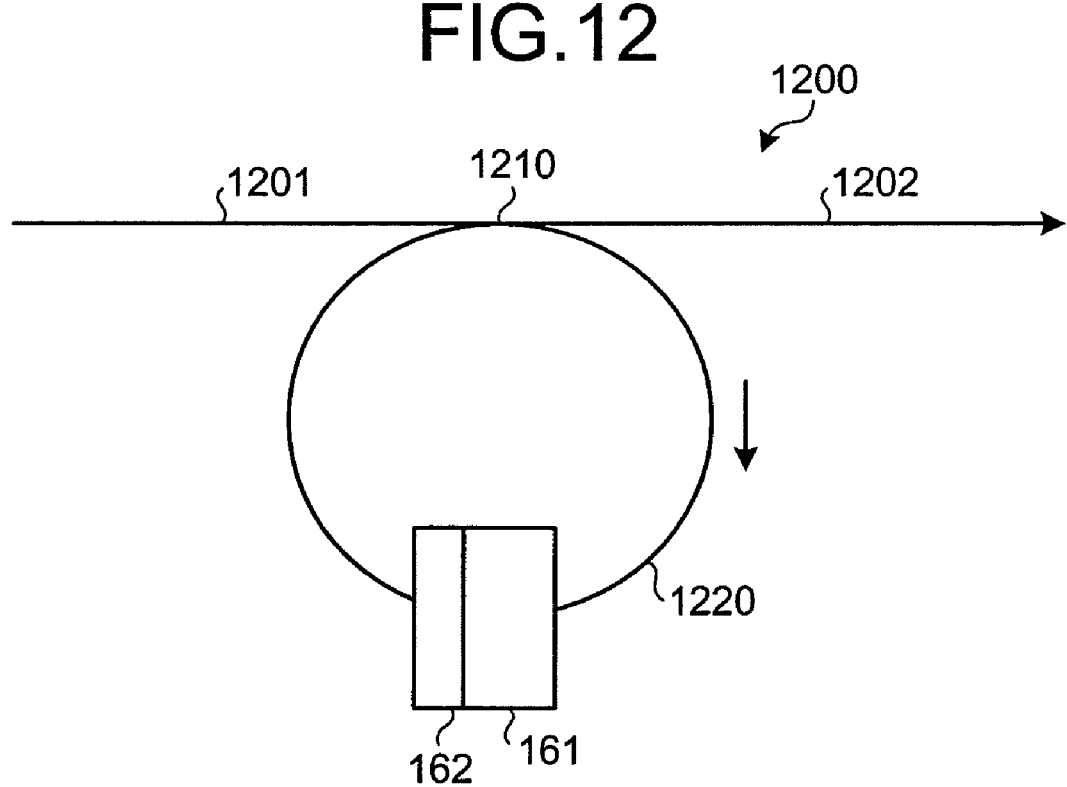
FIG. 12 is a plan view of a third variation of the optical modulator depicted in FIG. 1.

FIG. 12 is a plan view of a third variation of the optical modulator depicted in FIG. 1. In FIG. 12, elements that are similar to those of FIG. 1 are assigned the same corresponding signs, and explanation is omitted. As depicted in FIG. 12, an optical modulator 1200 is a ring optical interferometer that includes a directional coupler 1210, a ring waveguide 1220, the first liquid-crystal cell 161, and the second liquid-crystal cell 162.

An input light 1201 to the optical modulator 1200 is input to the directional coupler 1210. The directional coupler 1210 causes the input light 1201 and the light output from the ring waveguide 1220 to interfere. One of the lights obtained through the interference by the directional coupler 1210 is output downstream as an output light 1202, while the other light is output to the ring waveguide 1220.

The ring waveguide 1220 transmits, and outputs the light from the directional coupler 1210 to the input side of the directional coupler 1210. The first liquid-crystal cell 161 and the second liquid-crystal cell 162 are arranged on the ring waveguide 1220. The first liquid-crystal cell 161 transmits, and outputs the light from the output side of the directional coupler 1210 to the second liquid-crystal cell 162. The second liquid-crystal cell 162 transmits, and outputs the light from the first liquid-crystal cell 161 to the input side of the directional coupler 1210. In the figure, the first liquid-crystal cell 161 is provided on the right and the second liquid-crystal cell 162 is provided on the left; however, the order may be interchanged.

Figure 13:
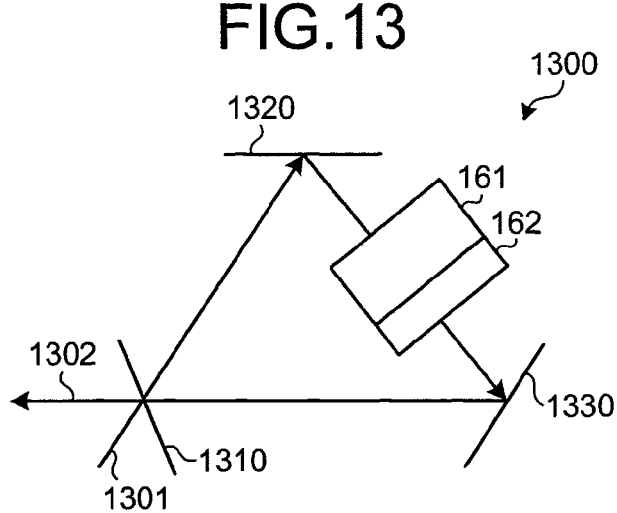
FIG. 13 is a plan view of a fourth variation of the optical modulator depicted in FIG. 1.

FIG. 13 is a plan view of a fourth variation of the optical modulator depicted in FIG. 1. In FIG. 13, elements that are similar to those of FIG. 1 are assigned the same correspond signs, and explanation is omitted. As depicted in FIG. 13, an optical modulator 1300 is a ring optical interferometer that includes a directional coupler 1310, a mirror 1320, and a mirror 1330.

An input light 1301 to the optical modulator 1300 is input to the directional coupler 1310. The directional coupler 1310 causes the input light 1301 and the light output from the mirror 1330 to interfere. One of the lights obtained through the interference by the directional coupler 1310 is output downstream as an output light 1302, while the other light is output to the mirror 1320.

The mirror 1320 reflects, and outputs the light from the directional coupler 1310 to the mirror 1330. The first liquid-crystal cell 161 and the second liquid-crystal cell 162 are arranged between the mirror 1320 and the mirror 1330. The first liquid-crystal cell 161 and the second liquid-crystal cell 162 transmit the light output from the mirror 1320 to the mirror 1330. The mirror 1330 reflects, and outputs the light from the mirror 1320 to the directional coupler 1310. In the figure, the first liquid-crystal cell 161 is provided on the upper left and the second liquid-crystal cell 162 is provided on the lower right; however, the order may be interchanged. Alternatively, the first liquid-crystal cell 161 and the second liquid-crystal cell 162 may be separately arranged in the ring resonator.

Figure 14:
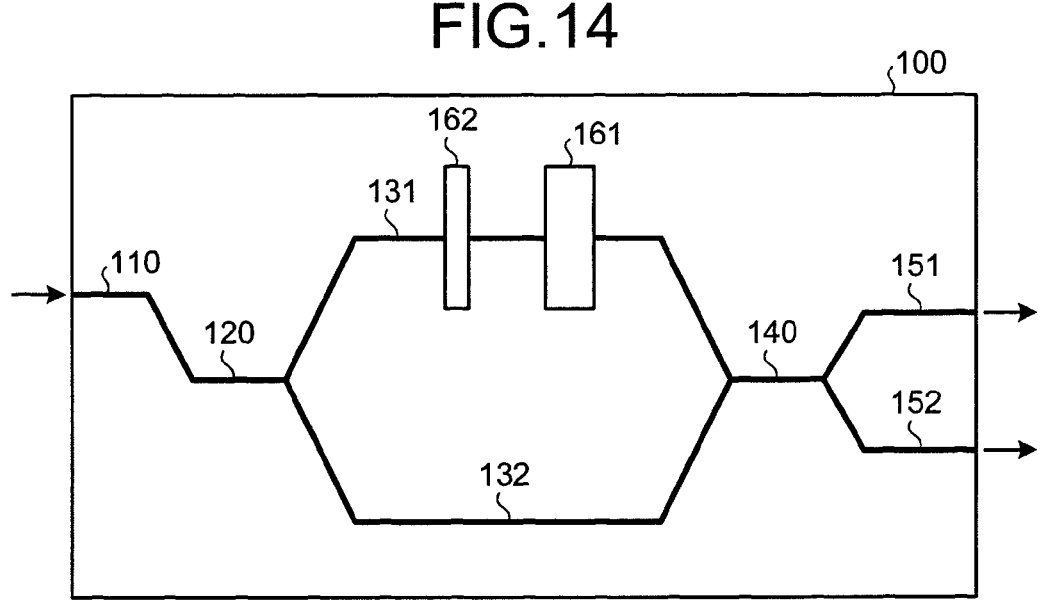
FIG. 14 is a plan view of a fifth variation of the optical modulator depicted in FIG. 1.

FIG. 14 is a plan view of a fifth variation of the optical modulator depicted in FIG. 1. In FIG. 14, elements that are similar to those of FIG. 1 are assigned the same corresponding signs, and explanation is omitted. As depicted in FIG. 14, the first liquid-crystal cell 161 and the second liquid-crystal cell 162 may not be layered and not integrated into one. In the figure, the first liquid-crystal cell 161 is provided on the right and the second liquid-crystal cell 162 is provided on the left; however, the order may be interchanged.

Here, the first liquid-crystal cell 161 and the second liquid-crystal cell 162 are arranged at different positions on the first waveguide 131. In FIG. 1, the second liquid-crystal cell 162 is provided downstream of the first liquid-crystal cell 161; however, as depicted in FIG. 14, the second liquid-crystal cell 162 may be provided upstream of the first liquid-crystal cell 161.

Figure 15:
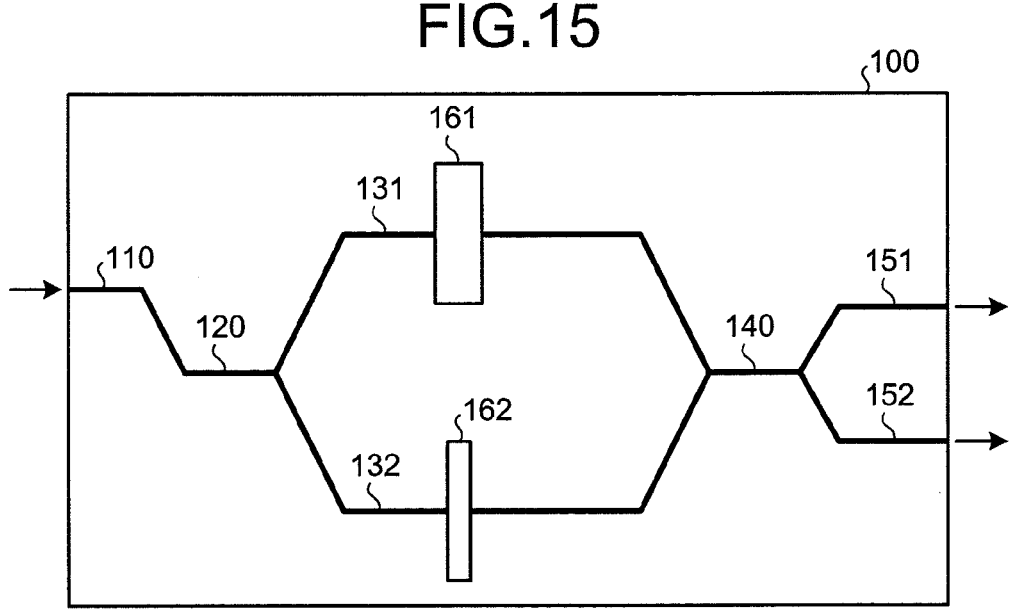
FIG. 15 is a plan view of a sixth variation of the optical modulator depicted in FIG. 1.

FIG. 15 is a plan view of a sixth variation of the optical modulator depicted in FIG. 1. In FIG. 15, elements that are similar to those of FIG. 1 are assigned the same corresponding signs, and explanation is omitted. In FIG. 1, both the first liquid-crystal cell 161 and the second liquid-crystal cell 162 are provided on the first waveguide 131; however, as depicted in FIG. 15, the first liquid-crystal cell 161 may be provided on the first waveguide 131 while the second liquid-crystal cell 162 is provided on the second waveguide 132. In the figure, the first liquid-crystal cell 161 is provided on the first waveguide 131 and the second liquid-crystal cell 162 is provided on the second waveguide 132; however, the liquid-crystal cells may be interchanged among the arms.

In each of the embodiments described above, the polarization direction of the input light is preferably set to be parallel to the slow axis of the liquid-crystal cell. When the input light is not polarized in one direction, a polarizer may be inserted at the position where the input light is input, for example, in the input unit. Alternatively, a polarization-independent configuration may be achieved by providing, in place of the polarizer, a polarization beam splitter(s) (PBS) that separates polarized input lights into two optical paths, and by connecting an interferometer in parallel.

Another polarization-independent configuration may be achieved by providing four liquid-crystal cells that are layered and include first correction liquid-crystal cells and second correction liquid-crystal cells that have the same configuration as the first liquid-crystal cell and the second liquid-crystal cell, respectively, except that the slow axes thereof are shifted by 90 degrees.

Figure 16:
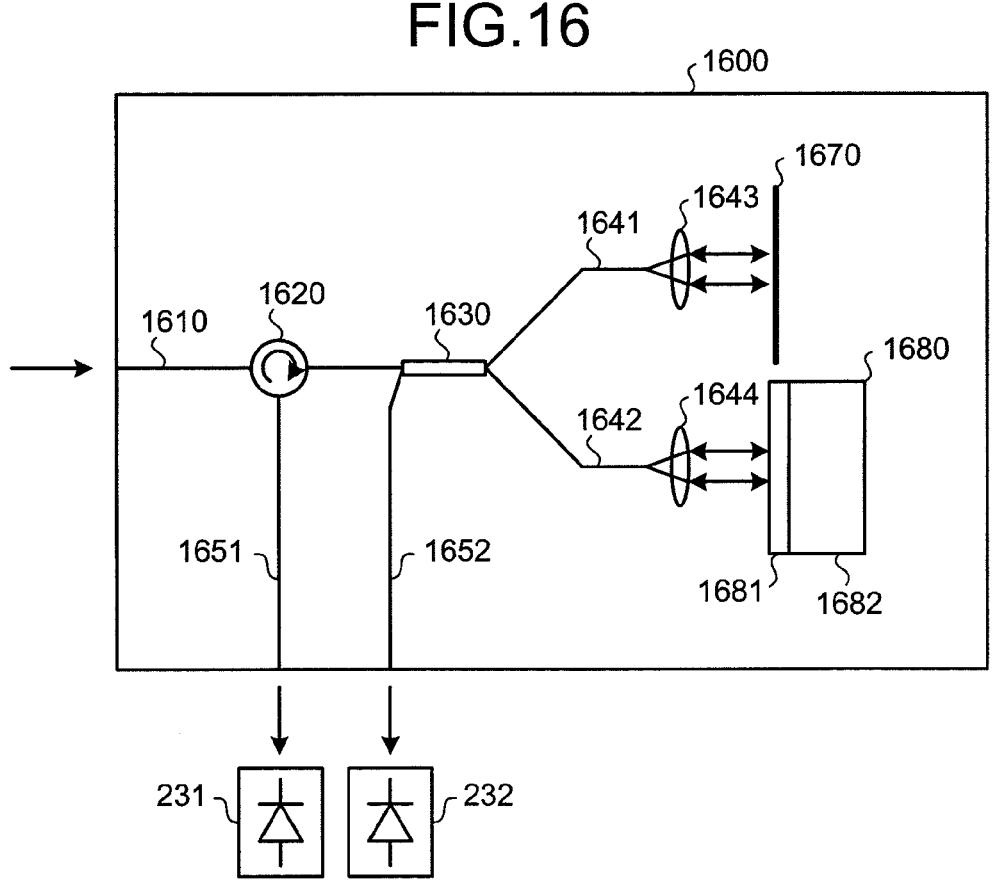
FIG. 16 is a plan view of a seventh variation of the optical modulator depicted in FIG. 1.

FIG. 16 is a plan view of a seventh variation of the optical modulator depicted in FIG. 1. As depicted in FIG. 16, an optical modulator 1600 according to the embodiment may be a Michelson interferometer in which an optical fiber or a waveguide is used in combination with a spatial optical system. The optical modulator 1600 depicted in FIG. 16 is an optical circuit equivalent to, for example, the Mach-Zehnder optical modulator 100 depicted in FIG. 1 when configured with a reflective liquid-crystal element.

More specifically, the optical modulator 1600 may include an input unit 1610, a circulator 1620, an optical coupler 1630, a first waveguide 1641, a second waveguide 1642, a lens 1643, a lens 1644, a first output unit 1651, a second output unit 1652, a reflection unit 1670, and a liquid-crystal unit 1680.

An input light to the optical modulator 1600 is input to the input unit 1610. The input unit 1610 outputs the input light to the circulator 1620. The circulator 1620 outputs the light from the input unit 1610 to the optical coupler 1630. The circulator 1620 also outputs the light from the optical coupler 1630 to the first output unit 1651.

The optical coupler 1630 is a 2×2 optical coupler. More specifically, the optical coupler 1630 branches the light from the circulator 1620 at the ratio of 1:1, and outputs the branched lights to the first waveguide 1641 and the second waveguide 1642. The optical coupler 1630 also combines the lights from the first waveguide 1641 and the second waveguide 1642, and outputs the combined light to the circulator 1620 and the second output unit 1652, respectively.

The first waveguide 1641 transmits, and outputs the light from the optical coupler 1630 to the lens 1643. The first waveguide 1641 also transmits, and outputs the light reflected by the reflection unit 1670 and focused by the lens 1643 to the optical coupler 1630. The lens 1643 collimates, and outputs the light from the first waveguide 1641 to the reflection unit 1670, and focuses the light reflected by the reflection unit 1670 to the end of the first waveguide 1641. The reflection unit 1670 reflects the light from the lens 1643 to the side of the lens 1643.

The second waveguide 1642 transmits, and outputs the light from the optical coupler 1630 to the lens 1644. The second waveguide 1642 also transmits, and outputs the light reflected by the liquid-crystal unit 1680 and focused by the lens 1644 to the optical coupler 1630. The lens 1644 collimates, and outputs the light from the second waveguide 1642 to the liquid-crystal unit 1680, and focuses the light reflected by the liquid-crystal unit 1680 to the end of the second waveguide 1642.

The liquid-crystal unit 1680 is a reflective liquid-crystal cell that includes a first liquid-crystal cell 1682 and a second liquid-crystal cell 1681. The liquid-crystal unit 1680 transmits the light from the lens 1644 through the first liquid-crystal cell 1682 and the second liquid-crystal cell 1681, and reflects the light to the side of the lens 1644. The first liquid-crystal cell 1682 and the second liquid-crystal cell 1681 correspond, for example, to the first liquid-crystal cell 161 and the second liquid-crystal cell 162 depicted in FIG. 1.

The lights reflected by the reflection unit 1670 and the liquid-crystal unit 1680 pass through the first waveguide 1641 and the second waveguide 1642, respectively, and are combined by the optical coupler 1630. At the ratio determined by the phase difference between the lights combined by the optical coupler 1630, lights are output to the circulator 1620 and the second output unit 1652, respectively. The light output to the circulator 1620 is output to the first output unit 1651.

The first output unit 1651 transmits and outputs the light from the circulator 1620. The second output unit 1652 transmits and outputs the light from the optical coupler 1630. The optical modulator 1600 depicted in FIG. 16 may be applied to, for example, the optical modulation device 200 depicted in FIG. 2. In this case, the first output unit 1651 outputs the light to the first PD 231. The second output unit 1652 outputs the light to the second PD 232.

Figure 17:
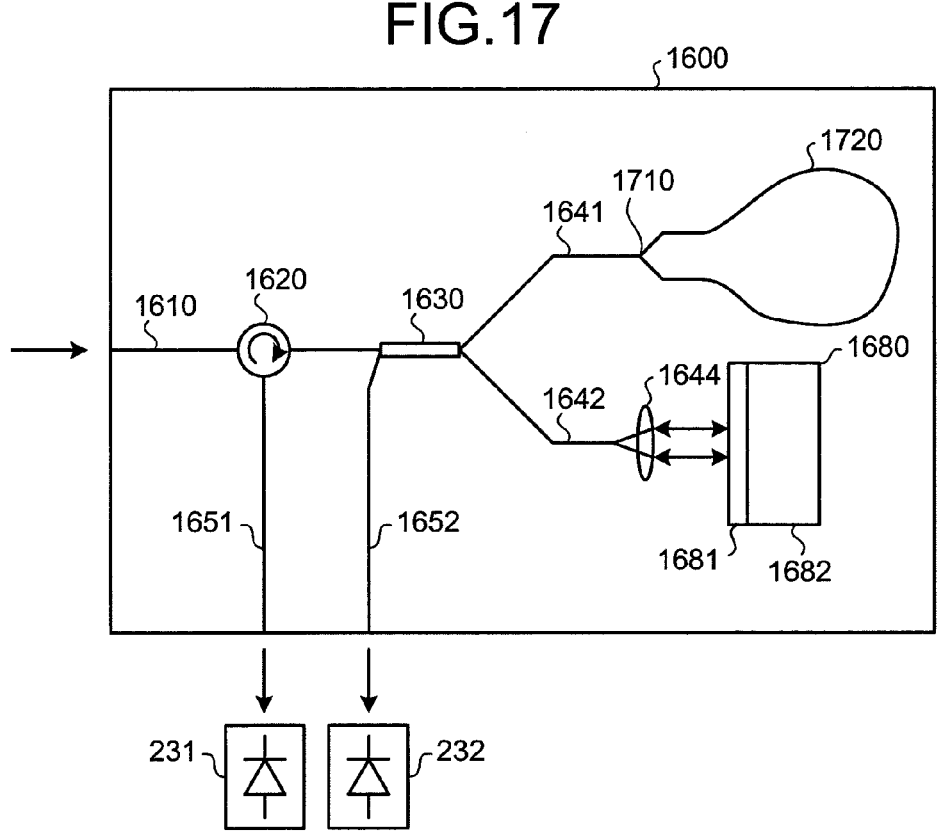
FIG. 17 is a plan view of a variation of the optical modulator depicted in FIG. 16.

FIG. 17 is a plan view of a variation of the optical modulator depicted in FIG. 16. In FIG. 17, elements that are similar to those of FIG. 16 are assigned the same corresponding signs, and explanation is omitted. As depicted in FIG. 17, the optical modulator 1600 may include an optical coupler 1710 and a loop mirror 1720 in place of the lens 1643 and the reflection unit 1670 depicted in FIG. 16.

The first waveguide 1641 outputs the light from optical coupler 1630 to the optical coupler 1710. The first waveguide 1641 also outputs the light from the optical coupler 1710 to the optical coupler 1630. The optical coupler 1710 is a 1×2 optical coupler. More specifically, the optical coupler 1710 branches the light from the first waveguide 1641, and outputs the branched lights to the ends of the loop mirror 1720, respectively. The optical coupler 1710 also combines and outputs to the first waveguide 1641, the lights from the ends of the loop mirror 1720.

The loop mirror 1720 is a loop optical waveguide that has the first end and the second end. The loop mirror 1720 outputs the light input from the first end through the second end, and the light input from the second end through the first end.

As explained above, in the optical modulator 1600, the optical coupler 1710 and the loop mirror 1720 configured with an optical waveguide may be used in place of the reflection unit 1670 configured with a spatial optical system. Thus, portions configured with spatial optical systems can be reduced, and accordingly positions that require adjustment of optical axes can be reduced and a vibration-resistant structure can be achieved.

Figure 18:
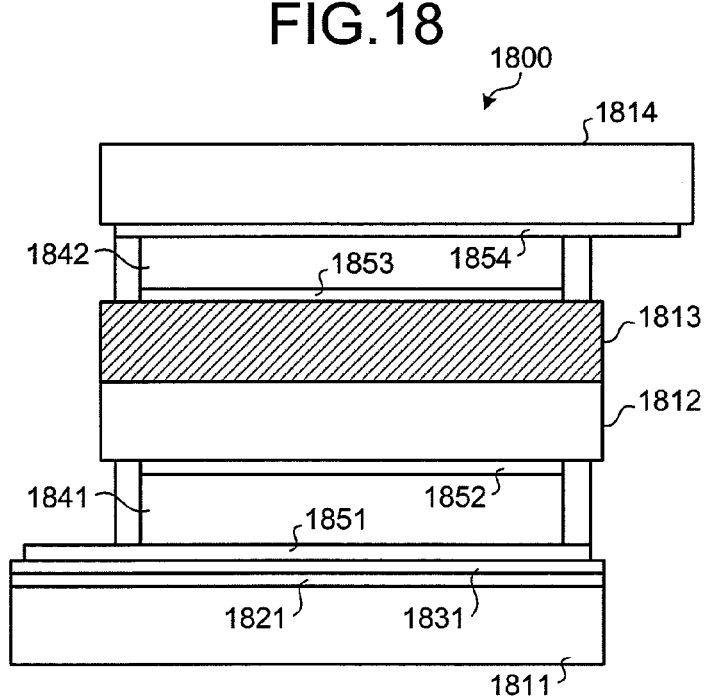
FIG. 18 is a frontal cross section of an example of a configuration of a liquid-crystal unit.
Figure 19:
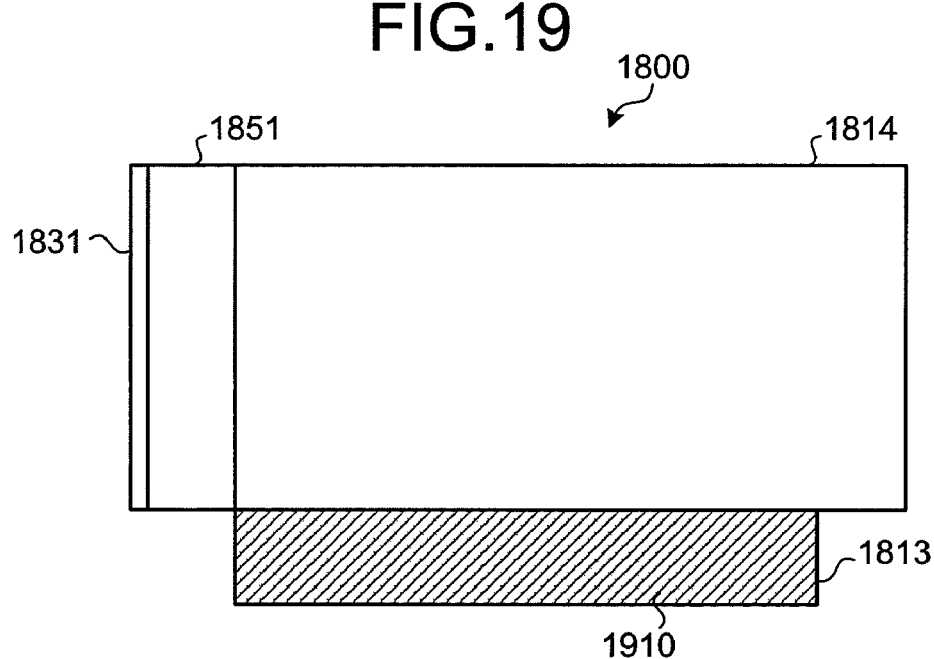
FIG. 19 is a plan view of the liquid-crystal unit depicted in FIG. 18.

FIG. 18 is a frontal cross section of an example of a configuration of the liquid-crystal unit. FIG. 19 is a plan view of the liquid-crystal unit depicted in FIG. 18. The first liquid-crystal cell 1682 and the second liquid-crystal cell 1681 depicted in FIGS. 16 and 17 are layered and integrated into one as the liquid-crystal unit 1680. The liquid-crystal unit 1680 may be realized by, for example, a reflective two-layer liquid-crystal cell module 1800 depicted in FIGS. 18 and 19.

The two-layer liquid-crystal cell module 1800 includes a silicon substrate 1811, an LCOS glass substrate 1812, a first substrate 1813, a second substrate 1814, a CMOS layer 1821, a reflection layer 1831, a first liquid-crystal layer 1841, a second liquid-crystal layer 1842, alignment films 1851 to 1854, and an electrode-connecting surface 1910.

The first liquid-crystal layer 1841 is sandwiched by the silicon substrate 1811 and the LCOS glass substrate 1812, and forms the first liquid-crystal cell 1682 depicted in FIGS. 16 and 17. The second liquid-crystal layer 1842 is sandwiched by the first substrate 1813 and the second substrate 1814, and forms the second liquid-crystal cell 1681 depicted in FIGS. 16 and 17. The LCOS glass substrate 1812 and the first substrate 1813 are layered.

The alignment film 1851 and the alignment film 1852 are arranged between the reflection layer 1831 and the first liquid-crystal layer 1841 and between the LCOS glass substrate 1812 and the first liquid-crystal layer 1841, respectively. The CMOS layer 1821 and the reflection layer 1831 are arranged between the silicon substrate 1811 and the alignment film 1851. The alignment film 1853 and the alignment film 1854 are arranged between the first substrate 1813 and the second liquid-crystal layer 1842 and between the second substrate 1814 and the second liquid-crystal layer 1842, respectively.

The light input from the second substrate 1814 passes through the first substrate 1813 and the LCOS glass substrate 1812, and is reflected by the reflection layer 1831. The light reflected by the reflection layer 1831 passes through the LCOS glass substrate 1812 and the first substrate 1813, and is output from the second substrate 1814. The electrode-connecting surface 1910 depicted in FIG. 19 is an electrode-connecting surface of the first substrate 1813 for applying the modulation signal.

The first liquid-crystal layer 1841 and the second liquid-crystal layer 1842 may be a one or two dimensional array of pixels. For example, the dither signal is applied to the second liquid-crystal layer 1842 while the phase-modulation signal is applied to the first liquid-crystal layer 1841. In other words, the first liquid-crystal layer 1841 on the side of the LCOS is used as a phase modulation element that requires accurate phase adjustment. Alternatively and inversely, the first liquid-crystal layer 1841 may be thinner than the second liquid-crystal layer 1842, and the dither signal may be applied to the first liquid-crystal layer 1841 while the phase-modulation signal is applied to the second liquid-crystal layer 1842.

Figure 20:
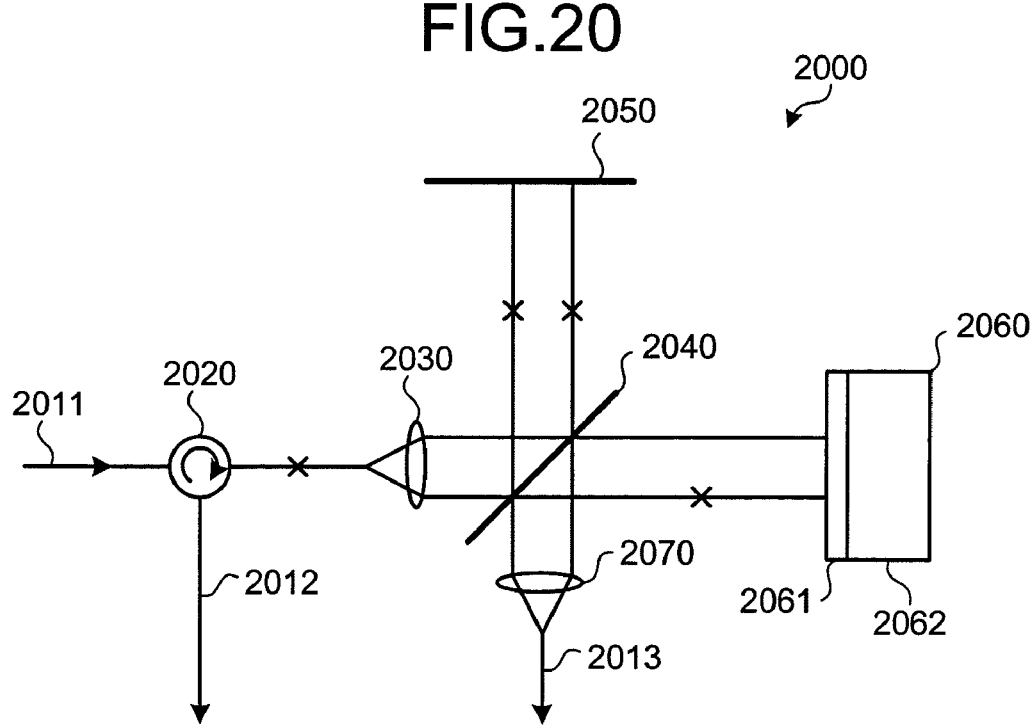
FIG. 20 is a plan view of an eighth variation of the optical modulator depicted in FIG. 1.

FIG. 20 is a plan view of an eighth variation of the optical modulator depicted in FIG. 1. As depicted in FIG. 20, an optical modulator 2000 according to the embodiment may be a Michelson interferometer that is mainly configured with spatial optical systems. The optical modulator 2000 depicted in FIG. 20 is an optical circuit equivalent to the Mach-Zehnder optical modulator 100 depicted in FIG. 1 when configured with a reflective liquid-crystal element.

More specifically, the optical modulator 2000 may include an input unit 2011, a first output unit 2012, a second output unit 2013, a circulator 2020, a first collimating lens 2030, a half mirror 2040, a reflection unit 2050, a liquid-crystal unit 2060, and a second collimating lens 2070. An input light to the optical modulator 2000 is input to the input unit 2011. The input unit 2011 outputs the input light to the circulator 2020.

The circulator 2020 outputs the light from the input unit 2011 to the first collimating lens 2030. The circulator 2020 also outputs the light focused by the first collimating lens 2030 to the first output unit 2012. The first collimating lens 2030 collimates, and outputs the light from the circulator 2020 to the half mirror 2040. The first collimating lens 2030 also focuses, and outputs the light from the half mirror 2040 to the circulator 2020.

The half mirror 2040 reflects, and outputs a part of the light from the first collimating lens 2030 to the reflection unit 2050, and outputs the rest of the light from the first collimating lens 2030 to the liquid-crystal unit 2060. The half mirror 2040 also combines the light from the reflection unit 2050 and the light from the liquid-crystal unit 2060, and outputs the combined light to the first collimating lens 2030 and the second collimating lens 2070, respectively. The reflection unit 2050 reflects, and outputs the light from the half mirror 2040 to the half mirror 2040.

The liquid-crystal unit 2060 has a similar configuration to the liquid-crystal unit 1680 depicted in FIGS. 16 and 17. The liquid-crystal unit 2060 includes a first liquid-crystal cell 2062 and a second liquid-crystal cell 2061. The liquid-crystal unit 2060 reflects, and outputs the light from the half mirror 2040 to the half mirror 2040. Thus, the lights from the liquid-crystal unit 2060 and the reflection unit 2050 are combined by the half mirror 2040, and at the ratio determined by the phase difference between the combined lights, lights are output to the first collimating lens 2030 and the second collimating lens 2070, respectively. The light output to the first collimating lens 2030 is output, via the circulator 2020, to the first output unit 2012. The second collimating lens 2070 focuses, and outputs the light from the half mirror 2040 to the second output unit 2013.

The first output unit 2012 transmits and outputs the light from the circulator 2020. The second output unit 2013 transmits and outputs the light from the second collimating lens 2070. The optical modulator 2000 depicted in FIG. 20 may be applied to, for example, the optical modulation device 200 depicted in FIG. 2. In this case, the first output unit 2012 outputs the light to the first PD 231. The second output unit 2013 outputs the light to the second PD 232.

The Michelson interferometer configured mainly with spatial optical systems described above can reduce the temperature dependency as compared to using a waveguide that has a large temperature dependency.

Figure 21:
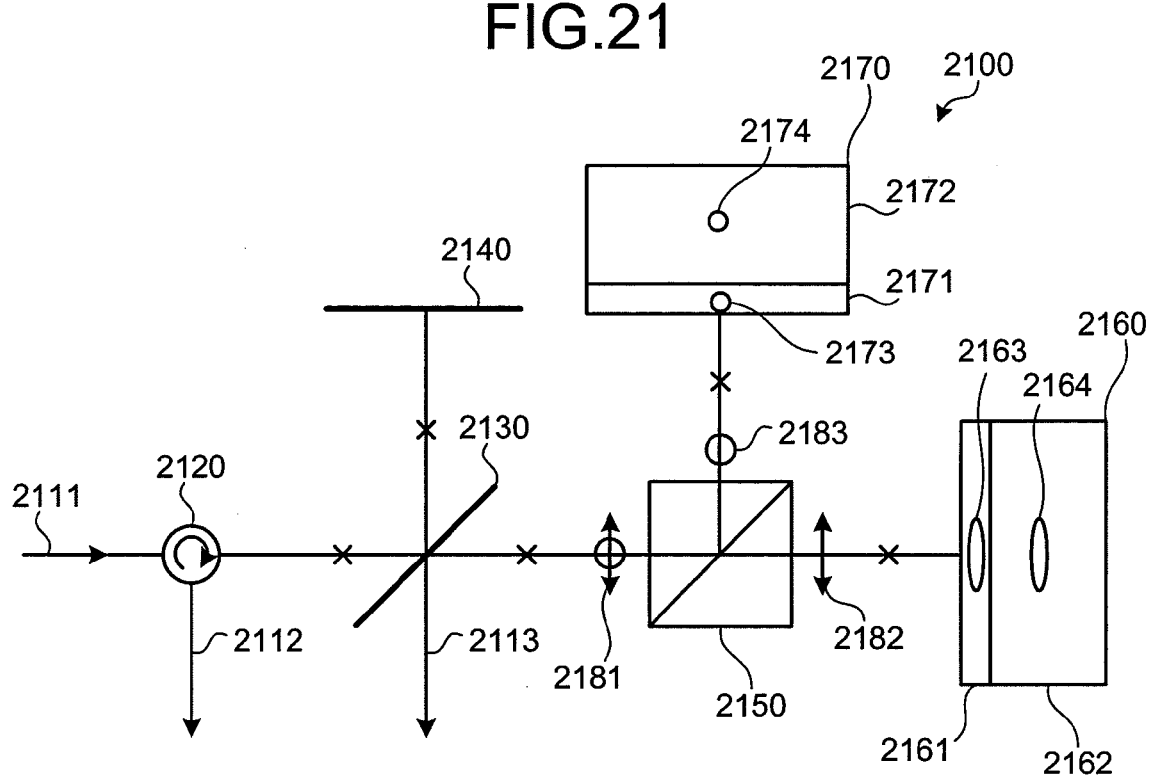
FIG. 21 is a plan view of a ninth variation of the optical modulator depicted in FIG. 1.

FIG. 21 is a plan view of a ninth variation of the optical modulator depicted in FIG. 1. As depicted in FIG. 21, an optical modulator 2100 according to the embodiment may be a polarization-independent Michelson interferometer. More specifically, the optical modulator 2100 may include an input unit 2111, a first output unit 2112, a second output unit 2113, a circulator 2120, a half mirror 2130, a reflection unit 2140, a PBS 2150, a liquid-crystal unit 2160, and liquid-crystal unit 2170.

An input light to the optical modulator 2100 is input to the input unit 2111. The input unit 2111 outputs the input light to the circulator 2120. The circulator 2120 outputs the light from the input unit 2111 to the half mirror 2130. The circulator 2120 also outputs the light from the half mirror 2130 to the first output unit 2112.

The half mirror 2130 reflects, and outputs a part of the light from the circulator 2120 to the reflection unit 2140, and outputs the rest of the light from the circulator 2120 to the PBS 2150. The half mirror 2130 also combines the light from the reflection unit 2140 and the light from the PBS 2150, and outputs the combined light to the circulator 2120 and the second output unit 2113, respectively.

The reflection unit 2140 reflects, and outputs the light from the half mirror 2130 to the half mirror 2130. A polarization direction 2181 indicates the polarization direction of the light output from the half mirror 2130 to the PBS 2150. As indicated by the polarization direction 2181, the light output from the half mirror 2130 to the PBS 2150 includes plural polarization components (for example, the s-polarized light and the p-polarized light).

The PBS 2150 separates the light from the half mirror 2130 into polarization components (for example, the s-polarized light and the p-polarized light), and output the separated lights to the liquid-crystal unit 2160 and the liquid-crystal unit 2170, respectively. A polarization direction 2182 indicates the polarization direction of the light output from the PBS 2150 to the liquid-crystal unit 2160. As indicated by the polarization direction 2182, the PBS 2150 outputs the p-polarized light to the liquid-crystal unit 2160. A polarization direction 2183 indicates the polarization direction of the light output from the PBS 2150 to the liquid-crystal unit 2170. As indicated by the polarization direction 2183, the PBS 2150 outputs the s-polarized light to the liquid-crystal unit 2170. The PBS 2150 also combines and outputs to the half mirror 2130, the lights from the liquid-crystal unit 2160 and the liquid-crystal unit 2170.

The liquid-crystal unit 2160 and the liquid-crystal unit 2170 respectively have a similar configuration to the liquid-crystal unit 1680 depicted in FIGS. 16 and 17, except the liquid-crystal unit 2160 has the director orientation (the orientation of liquid-crystal molecules) parallel to the p-polarized light. A molecule orientation 2163 indicates the orientation of liquid-crystal molecules of the second liquid-crystal cell 2161 of the liquid-crystal unit 2160. A molecule orientation 2164 indicates the orientation of liquid-crystal molecules of the first liquid-crystal cell 2162 of the liquid-crystal unit 2160.

On the other hand, the liquid-crystal unit 2170 has the director orientation parallel to the s-polarized light. A molecule orientation 2173 indicates the orientation of liquid-crystal molecules of the second liquid-crystal cell 2171 of the liquid-crystal unit 2170. A molecule orientation 2174 indicates the orientation of liquid-crystal molecule of the first liquid-crystal cell 2172 of the liquid-crystal unit 2170.

The liquid-crystal unit 2160 reflects, and outputs the light from the PBS 2150 to the PBS 2150. The liquid-crystal unit 2170 reflects, and outputs the light from the PBS 2150 to the PBS 2150. Thus, the lights from the PBS 2150 and the reflection unit 2140 are combined by the half mirror 2130, and at the ratio determined by the phase difference between the combined lights, lights are output to the circulator 2120 and the second output unit 2113, respectively. The light output to the circulator 2120 is output to the first output unit 2112.

The first output unit 2112 transmits and outputs the light from the circulator 2120. The second output unit 2113 transmits and outputs the light from the half mirror 2130. The optical modulator 2100 depicted in FIG. 21 may be applied to, for example, the optical modulation device 200 depicted in FIG. 2. In this case, the first output unit 2112 outputs the light to the first PD 231. The second output unit 2113 outputs the light to the second PD 232.

As described above, the s-polarized light and the p-polarized light included in the light are separated by the PBS 2150, and modulated by liquid-crystal phase modulation elements (the liquid-crystal units 2160 and 2170) dedicated thereto, respectively. Thus, a polarization-independent structure that is independent from the polarization state of the input light to the input unit 2111 can be achieved. Furthermore, the light can be effectively utilized since the polarization separation of light at the upstream of the optical modulator 2100 is not necessary.

By applying dither signals of different frequencies to the liquid-crystal unit 2160 and the liquid-crystal unit 2170, it is also possible to detect the phase deviation and to control the phase amount for each of the s-polarized light and the p-polarized light. Since the phase amounts of the s-polarized light and the p-polarized light can be controlled independently, this variation is useful for modules that use polarized lights such as used in polarization multiplexing.

Not depicted in the figure, the optical modulation device may be configured as an optical fiber type or waveguide type in which the half mirror depicted in FIG. 21 is replaced with two 1×2 couplers and a loop mirror. Particularly, when configured with the optical fiber, the optical fiber is preferably configured with a polarization maintaining fiber (PMF) of which polarization direction is aligned with the PBS.

Figure 22:
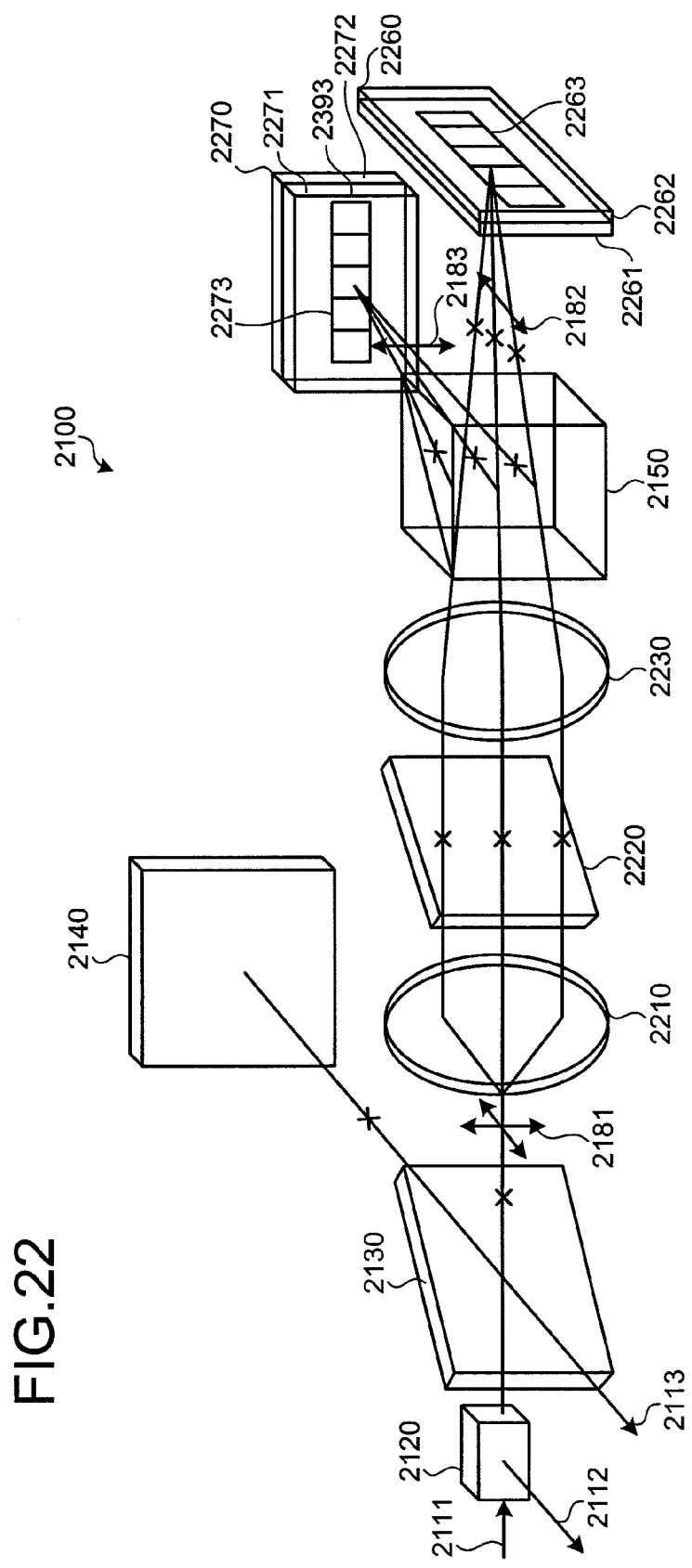
FIG. 22 is a perspective view of a variation of the optical modulator depicted in FIG. 21.

FIG. 22 is a perspective view of a variation of the optical modulator depicted in FIG. 21. In FIG. 22, elements that are similar to those of FIG. 21 are assigned the same corresponding signs, and explanation is omitted. As depicted in FIG. 22, the optical modulator 2100 according to the embodiment may be configured with a spectroscope.

More specifically, the optical modulator 2100 has a similar configuration to FIG. 21 except that the liquid-crystal unit 2160 and the liquid-crystal unit 2170 are replaced with a collimating lens 2210, a spectroscope 2220, a lens 2230, a liquid-crystal unit 2260, and a liquid-crystal unit 2270. The collimating lens 2210 collimates, and outputs the light from the half mirror 2130 to the spectroscope 2220. The collimating lens 2210 also focuses, and outputs the light from the spectroscope 2220 to the half mirror 2130.

The spectroscope 2220 separates the light from the collimating lens 2210 according to wavelength and outputs the wavelength-separated lights to the lens 2230. The spectroscope 2220 also combines, and outputs the wavelength-separated lights from the lens 2230 to the collimating lens 2210. The lens 2230 focuses, and outputs the wavelength-separated lights from the spectroscope 2220 to the PBS 2150. The lens 2230 collimates, and outputs the wavelength-separated lights from the PBS 2150 to the spectroscope 2220.

The PBS 2150 outputs the p-polarized lights included in the wavelength-separated lights output from the lens 2230 to the liquid-crystal unit 2260. The PBS 2150 also outputs the s-polarized lights included in the wavelength-separated lights output from the lens 2230 to the liquid-crystal unit 2270.

The liquid-crystal unit 2260 has a similar configuration to the liquid-crystal unit 2160 depicted in FIG. 21. The liquid-crystal unit 2260 includes a first liquid-crystal cell 2262 and a second liquid-crystal cell 2261. However, on the liquid-crystal unit 2260, reflective electrode units 2263 that correspond to the wavelength-separated lights output from the PBS 2150 are patterned. The reflective electrode units 2263 reflect the wavelength-separated lights, and modulate the wavelength-separated lights independently according to the applied modulation signal. The liquid-crystal unit 2260 reflects, and outputs the wavelength-separated lights output from the PBS 2150 to the PBS 2150.

The liquid-crystal unit 2270 has a similar configuration to the liquid-crystal unit 2170 depicted in FIG. 21. The liquid-crystal unit 2270 includes a first liquid-crystal cell 2272 and a second liquid-crystal cell 2271; except, on the liquid-crystal unit 2270, reflective electrode units 2273 that correspond to the wavelength-separated lights output from the PBS 2150 are patterned. The reflective electrode units 2273 reflect the wavelength-separated lights, and modulate the wavelength-separated lights independently according to the applied modulation signal. The liquid-crystal unit 2270 reflects, and outputs the wavelength-separated lights output from the PBS 2150 to the PBS 2150.

Phase control for each wavelength can be achieved by inserting the spectroscope 2220 in a polarization-independent Michelson interferometer and assigning LCOS pixels to the wavelengths as described above. Furthermore, dither signals of different frequencies can be applied for the wavelengths, respectively, by forming plural pixels on a transmissive liquid-crystal element to which the dither signals are applied. This is particularly suitable for wavelength-multiplexed optical systems and communication systems.

Here, the spectroscopic portion is preferably configured with a 4f telecentric optical system that is configured such that the effective focal distances of the collimating lens 2210 and the lens 2230, the average position (the position on the optical axis) of the spectroscope 2220, and in terms of the optical path length, the position of the reflective mirrors of the liquid-crystal unit 2260 and the liquid-crystal unit 2270 are the same.

The focus to the reflective electrode units 2263 and the reflective electrode units 2273 is adjusted by adjusting the lens 2230 or the optical path lengths from the lens 2230 to the reflective electrode units 2263 and the reflective electrode units 2273. The transparent substrates of the second liquid-crystal cell 2261 of the liquid-crystal unit 2260 and the second liquid-crystal cell 2271 of the liquid-crystal unit 2270 may be patterned to apply small dither modulation using different frequencies according to wavelength.

Figure 23:
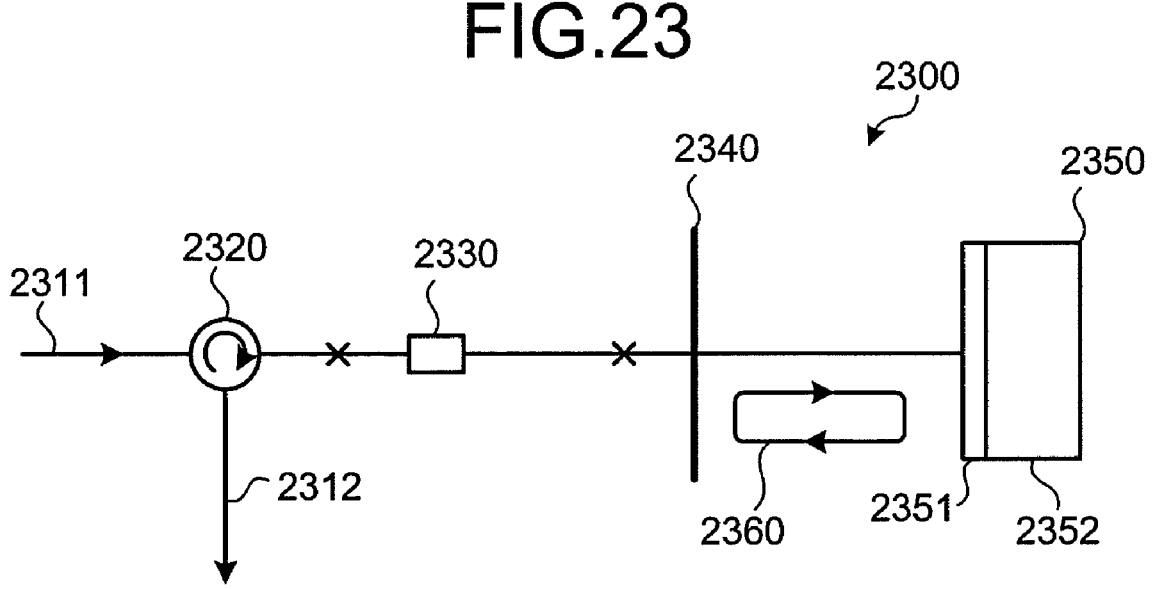
FIG. 23 is a plan view of a tenth variation of the optical modulator depicted in FIG. 1.

FIG. 23 is a plan view of a tenth variation of the optical modulator depicted in FIG. 1. As depicted in FIG. 23, an optical modulator 2300 according to the embodiment may be a Gires-Tournois (GT) interferometer that uses a phase modulation element as a multiple-reflection element. More specifically, the optical modulator 2300 may include an input unit 2311, a first output unit 2312, a circulator 2320, a collimator 2330, a half mirror 2340, and a liquid-crystal unit 2350.

An input unit to the optical modulator 2300 is input to the input unit 2311. The input unit 2311 outputs the input light to the circulator 2320. The circulator 2320 outputs the light from the input unit 2311 to the collimator 2330. The circulator 2320 also outputs the light focused by the collimator 2330 to the first output unit 2312.

The collimator 2330 collimates, and outputs the light from the circulator 2320 to the half mirror 2340. The collimator 2330 also focuses, and outputs the light from the half mirror 2340 to the circulator 2320.

The half mirror 2340 reflects a part of the light from the collimator 2330. At the same time, the half mirror 2340 outputs the rest of the light from the collimator 2330 to the liquid-crystal unit 2350. The half mirror 2340 also reflects, and outputs a part of the light from the liquid-crystal unit 2350 to the liquid-crystal unit 2350, and outputs the rest of the light from the liquid-crystal unit 2350 to the collimator 2330.

The liquid-crystal unit 2350 has a similar configuration to the liquid-crystal unit 1680 depicted in FIGS. 16 and 17. The liquid-crystal unit 2350 includes a first liquid-crystal cell 2352 and a second liquid-crystal cell 2351. The liquid-crystal unit 2350 reflects, and outputs the light from the half mirror 2340 to the half mirror 2340. Thus, as indicated by the sign 2360, the light is multiple-reflected between the half mirror 2340 and the liquid-crystal unit 2350.

The light reflected to the half mirror 2340 from the liquid-crystal unit 2350 and the light reflected to the collimator 2330 from the half mirror 2340 are caused to interfere with each other, and are output to the collimator 2330. Thus, by using the liquid-crystal unit 2350 (phase modulation element) as a multiple-reflection element, sharp resonance characteristics similar to the Fabry-Pérot interferometer depicted in FIG. 11 can be obtained. Furthermore, according to the configuration depicted in FIG. 23, the number of elements is few and a simple configuration can be achieved. Furthermore, according to the configuration depicted in FIG. 23, the optical path is one and is not branched, thereby enabling accurate alignment of optical axis.

As described above, the optical modulators according to the embodiments can perform phase modulation of a sufficient phase amount by the first thick liquid-crystal cell, and also perform small phase modulation by the second thin liquid-crystal cell having high response speed. Thus, stable phase modulation can be achieved. Furthermore, since the phase modulation and the small phase modulation can be performed by one module, stable phase modulation can be achieved without complicated spatial optical systems and/or waveguide optical systems.

Since the first liquid-crystal cell 161 and the second liquid-crystal cell 162 are layered and integrated into one, the first liquid-crystal cell 161 and the second liquid-crystal cell 162 are layered and formed in one sequence of processing, thereby reducing manufacturing steps. Furthermore, the insertion loss can be reduced by forming the first liquid-crystal cell 161 and the second liquid-crystal cell 162 as one element, as compared to forming the first liquid-crystal cell 161 and the second liquid-crystal cell 162 as separate elements, for example.

Furthermore, the power consumption of the device can be reduced by performing phase modulation by the first liquid-crystal cell 161 and the second liquid-crystal cell 162. The power consumption of the device is particularly reduced when the nematic liquid-crystal cell 600 is used as the first liquid-crystal cell 161 and the second liquid-crystal cell 162, thereby enabling low-voltage drive at 5V or less. The loss in the liquid-crystal cells of the first liquid-crystal cell 161 and the second liquid-crystal cell 162 is small since a liquid-crystal cell having large optical anisotropy can be formed thin (several tens of or less).

By supporting the liquid-crystal cells of the first liquid-crystal cell 161 and the second liquid-crystal cell 162 by substrates of such as glass (see FIGS. 6 to 8), the first liquid-crystal cell 161 and the second liquid-crystal cell 162 can be easily inserted on the optical path of interferometers configured with spatial optical systems (see FIG. 10, FIG. 11, and FIG. 13). By inserting the first liquid-crystal cell 161 and the second liquid-crystal cell 162 on the waveguide of interferometers configured with waveguides (see FIG. 1, FIG. 12, FIG. 14, and FIG. 15), the insertion loss can be reduced.

INDUSTRIAL APPLICABILITY

As described above, the phase modulator and the optical modulation device according to the present invention are useful for phase modulators and optical modulation devices for modulating light, and particularly suitable for phase modulators and optical modulation devices used in an optical communication system.

What is claimed is:

1. An optical modulator comprising:
   a first liquid-crystal cell that includes a first liquid-crystal layer between a pair of substrates;
   a second liquid-crystal cell that includes a second liquid-crystal layer between a pair of substrates; and
   a drive circuit that drives the first liquid-crystal cell and the second liquid-crystal cell, wherein
   the second liquid-crystal layer is thinner than the first liquid-crystal layer, and
   the drive circuit includes
      a phase-modulation unit that delays a light passing through the first liquid-crystal cell and applies a phase-modulation signal to control the phase of the light; and
      a small-modulation unit that delays a light passing through the second liquid-crystal cell and applies a small-phase-modulation signal to finely control the phase of the light.

2. The phase modulator according to claim 1, wherein the drive circuit detects a variation component that is caused by the small-phase-modulation signal and included in the light that has passed through the first liquid-crystal cell and the second liquid-crystal cell, and controls the phase-modulation signal based on a result of detection.

3. The phase modulator according to claim 1, wherein the thickness of the liquid-crystal layer of the second liquid-crystal cell is ¼ or less of the thickness of the first liquid-crystal cell.

4. The phase modulator according to claim 1, wherein the first liquid-crystal cell and the second liquid-crystal cell are layered on each other.

5. The phase modulator according to claim 4, wherein one of the substrates of the first liquid-crystal cell and one of the substrates of the second liquid-crystal cell are a common substrate.

6. The phase modulator according to claim 1, wherein the polarization direction of an input light to the first liquid-crystal cell or the second liquid-crystal cell is parallel to the slow axis of the first liquid-crystal cell or the second liquid-crystal cell.

7. The phase modulator according to claim 1, wherein a polarizer or a polarization beam splitter is arranged at a position where an input light input to the first liquid-crystal cell or the second liquid-crystal cell passes through.

8. The phase modulator according to claim 1, further comprising a first correction liquid-crystal cell and a second correction liquid-crystal cell that are layered on each other, wherein
   the first correction liquid-crystal cell has the same configuration as the first liquid-crystal cell except that the slow axis thereof is shifted by 90 degrees, and
   the second correction liquid-crystal cell has the same configuration as the second liquid-crystal cell except that the slow axis thereof is shifted by 90 degrees.

9. An optical modulation device comprising:
   an optical interferometer that branches an input light and causes branched lights to interfere; and
   a phase modulator according to claim 1, wherein
   the first liquid-crystal cell and the second liquid-crystal cell transmit the branched lights, respectively.

10. The optical modulation device according to claim 9, wherein the optical interferometer includes an input unit, a splitter unit, a first waveguide, a second waveguide, and an directional coupler unit, and the first liquid-crystal cell and the second liquid-crystal cell are arranged on the first waveguide or the second waveguide.

11. The optical modulation device according to claim 9, wherein the optical interferometer includes a splitter, a plurality of mirrors, and a combiner, and the first liquid-crystal cell and the second liquid-crystal cell are arranged between any two of the mirrors.

12. The optical modulation device according to claim 9, wherein the optical interferometer includes a splitter and a combiner, the first liquid-crystal cell and the second liquid-crystal cell are arranged between the splitter and the combiner, and a light is multiple-reflected between the splitter and the combiner.

13. The optical modulation device according to claim 9, wherein the optical interferometer includes a directional coupler and a ring waveguide, and the first liquid-crystal cell and the second liquid-crystal cell are arranged in the ring waveguide.

14. The optical modulation device according to claim 9, wherein the optical interferometer includes a directional coupler and a plurality of mirrors, and the first liquid-crystal cell and the second liquid-crystal cell are arranged between any two of the mirrors.

15. An optical modulation device comprising:

an optical interferometer that branches an input light and causes branched lights to interfere; and a phase modulator according to claim 1, wherein the first liquid-crystal cell or the second liquid-crystal cell are reflective liquid-crystal elements that reflect the branched lights, respectively.

16. The optical modulation device according to claim 15, wherein the optical interferometer includes an input unit, a circulator, an optical coupler, a first waveguide, and a second waveguide, and the first liquid-crystal cell and the second liquid-crystal cell are arranged at a position radiated by a light output from the first waveguide or the second waveguide.

17. The optical modulation device according to claim 15, wherein the optical interferometer includes an input unit, a circulator, a collimating lens, a half mirror, and a reflection unit, the half mirror reflects, and outputs a part of a light from the collimating lens to the reflection unit, and the first liquid-crystal cell and the second liquid-crystal cell are arranged at a position radiated by the rest of the light from the collimating lens.

18. The optical modulation device according to claim 15, wherein the optical interferometer includes an input unit, a circulator, a half mirror, a reflection unit, and a polarization beam splitter, the half mirror reflects, and outputs a part of a light from the circulator to the reflection unit, and outputs the rest of the light from the circulator to the polarization beam splitter, and the first liquid-crystal cell and the second liquid-crystal cell are arranged at a position radiated by a light output from the polarization beam splitter.

19. The optical modulation device according to claim 15, wherein the optical interferometer includes a collimating lens, a reflection unit, a spectroscope, a half mirror, and a polarization beam splitter, the half mirror reflects, and outputs a part of an input light to the reflection unit, and outputs the rest of the light to the collimating lens, the spectroscope separates a light from the collimating lens according to wavelength, and outputs the wavelength-separated lights to the polarization beam splitter, and the first liquid-crystal cell and the second liquid-crystal cell are arranged at a position radiated by wavelength-separated lights output from the polarization beam splitter.

20. The optical modulation device according to claim 15, wherein the optical interferometer includes an input unit, a circulator, a collimator, and a half mirror, a light output from the collimator is radiated on the half mirror, and the first liquid-crystal cell and the second liquid-crystal cell are arranged at a position radiated by a light that has passed through the half mirror.

* * * * *